US010782781B2

(12) United States Patent
Joseph et al.

(10) Patent No.: US 10,782,781 B2
(45) Date of Patent: *Sep. 22, 2020

(54) MULTIPURPOSE COMPUTER MOUSE

(71) Applicant: Magnima, LLC, Midway City, CA (US)

(72) Inventors: Anoop Molly Joseph, Midway City, CA (US); Chaithanya Mouli, Chicago, IL (US)

(73) Assignee: Magnima LLC, Midway City, CA (US)

(*) Notice: Subject to any disclaimer, the term of this patent is extended or adjusted under 35 U.S.C. 154(b) by 147 days.

This patent is subject to a terminal disclaimer.

(21) Appl. No.: 16/070,961

(22) PCT Filed: Jan. 18, 2017

(86) PCT No.: PCT/US2017/013978
§ 371 (c)(1),
(2) Date: Jul. 18, 2018

(87) PCT Pub. No.: WO2017/127451
PCT Pub. Date: Jul. 27, 2017

(65) Prior Publication Data
US 2020/0125170 A1  Apr. 23, 2020

Related U.S. Application Data

(60) Provisional application No. 62/280,113, filed on Jan. 18, 2016.

(51) Int. Cl.
G06F 3/01 (2006.01)
G06F 3/03 (2006.01)
(Continued)

(52) U.S. Cl.
CPC ............ G06F 3/014 (2013.01); G06F 3/0304 (2013.01); G06F 3/039 (2013.01); G06F 3/0346 (2013.01);
(Continued)

(58) Field of Classification Search
CPC combination set(s) only.
See application file for complete search history.

(56) References Cited

U.S. PATENT DOCUMENTS

D328,597 S    8/1992  Clouss
6,590,563 B1  7/2003  Oross et al.
(Continued)

FOREIGN PATENT DOCUMENTS

WO    2009151400    12/2009

OTHER PUBLICATIONS

PCT Search Report dated May 1, 2017 for PCT/US2017/013978 filed on Jan. 18, 2017 entitled Multipurpose Computer Mouse.
(Continued)

Primary Examiner — Deeprose Subedi
(74) Attorney, Agent, or Firm — Fish IP Law, LLP

(57) ABSTRACT

A computer input device system that includes a finger-wearable input unit that is capable of providing inputs in a two-dimensional plane or in three-dimensional space. The inventive subject matter also includes a mouse frame that receives the finger-wearable unit, allowing a user to quickly transition from the finger-wearable unit to the mouse frame for traditional table-top mouse operation and back. The mouse frame includes features that allow for simple, easy and precise docking and undocking of the finger-wearable unit. The finger-wearable unit can be made up of separable modules and links that allow for reconfiguration of the finger-wearable unit according to a users needs.

10 Claims, 10 Drawing Sheets

(51) Int. Cl.
*G06F 3/0346* (2013.01)
*G06F 3/0354* (2013.01)
*G06F 3/038* (2013.01)
*G06F 3/039* (2013.01)
*H04W 92/18* (2009.01)

(52) U.S. Cl.
CPC ........ *G06F 3/0383* (2013.01); *G06F 3/03543* (2013.01); *G06F 3/03544* (2013.01); *G06F 2203/0331* (2013.01); *H04W 92/18* (2013.01)

(56) References Cited

U.S. PATENT DOCUMENTS

| | | |
|---|---|---|
| 2003/0214482 A1 | 11/2003 | Chen |
| 2005/0253811 A1 | 11/2005 | Hiromori |
| 2006/0001646 A1 | 1/2006 | Hai |
| 2006/0007151 A1 | 1/2006 | Ram |
| 2008/0084385 A1 | 4/2008 | Ranta |
| 2009/0213077 A1* | 8/2009 | Bailen .................. G06F 3/0317 345/164 |
| 2010/0045604 A1 | 2/2010 | Kim |
| 2010/0110009 A1* | 5/2010 | Wong .................. G06F 3/03543 345/163 |
| 2010/0231514 A1 | 9/2010 | Min-Liang |
| 2011/0205158 A1 | 8/2011 | Hsu |
| 2011/0210931 A1 | 9/2011 | Shai |
| 2011/0260975 A1* | 10/2011 | Lin .................. G06F 3/03543 345/166 |
| 2012/0206346 A1 | 8/2012 | Liao |
| 2013/0002547 A1 | 1/2013 | Cheng |
| 2014/0098067 A1 | 4/2014 | Yang |
| 2014/0292656 A1 | 10/2014 | Bailen |
| 2016/0231819 A1 | 8/2016 | Chavez |
| 2016/0282935 A1* | 9/2016 | Yang .................. G06F 3/0346 |
| 2017/0123510 A1 | 5/2017 | Parham |
| 2017/0205879 A1* | 7/2017 | Joseph .................. G06F 3/014 |

OTHER PUBLICATIONS

A. Hguyen et al., 3DTouch: A wearable 3D input device for 3D applications, Department of Computer Science, University of Wyoming, Date of Conference: Mar. 23-27, 2015 (Arles, France).

* cited by examiner

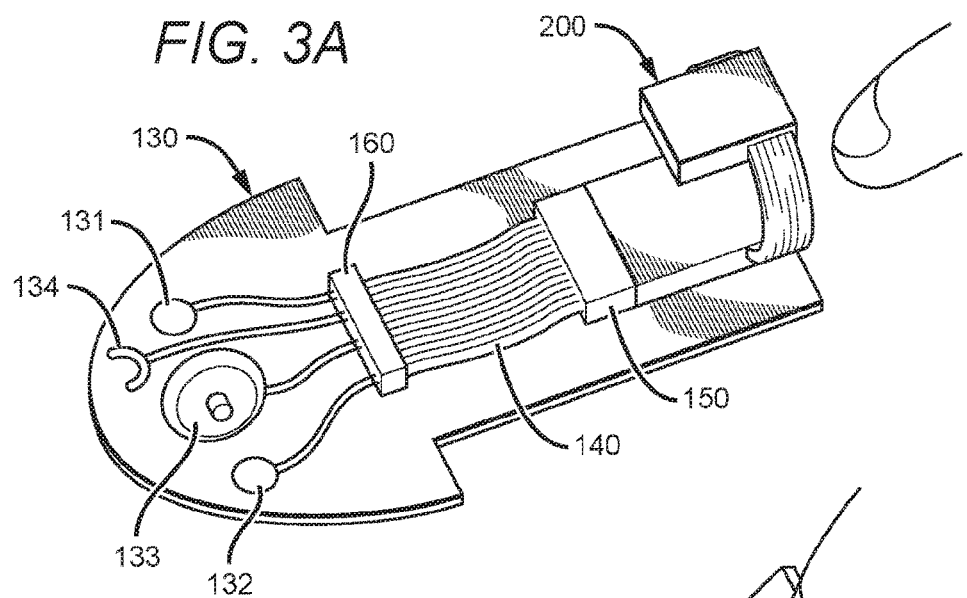
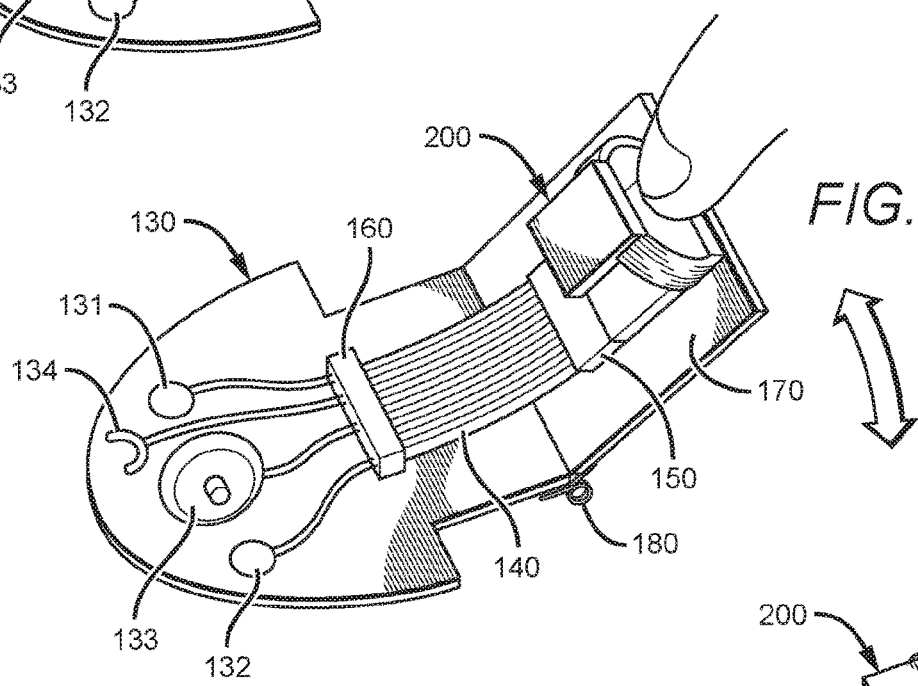
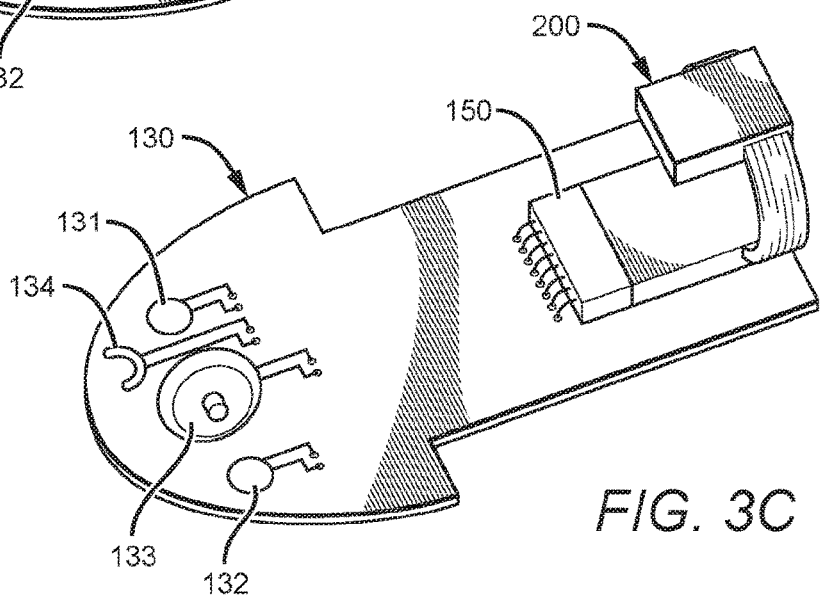

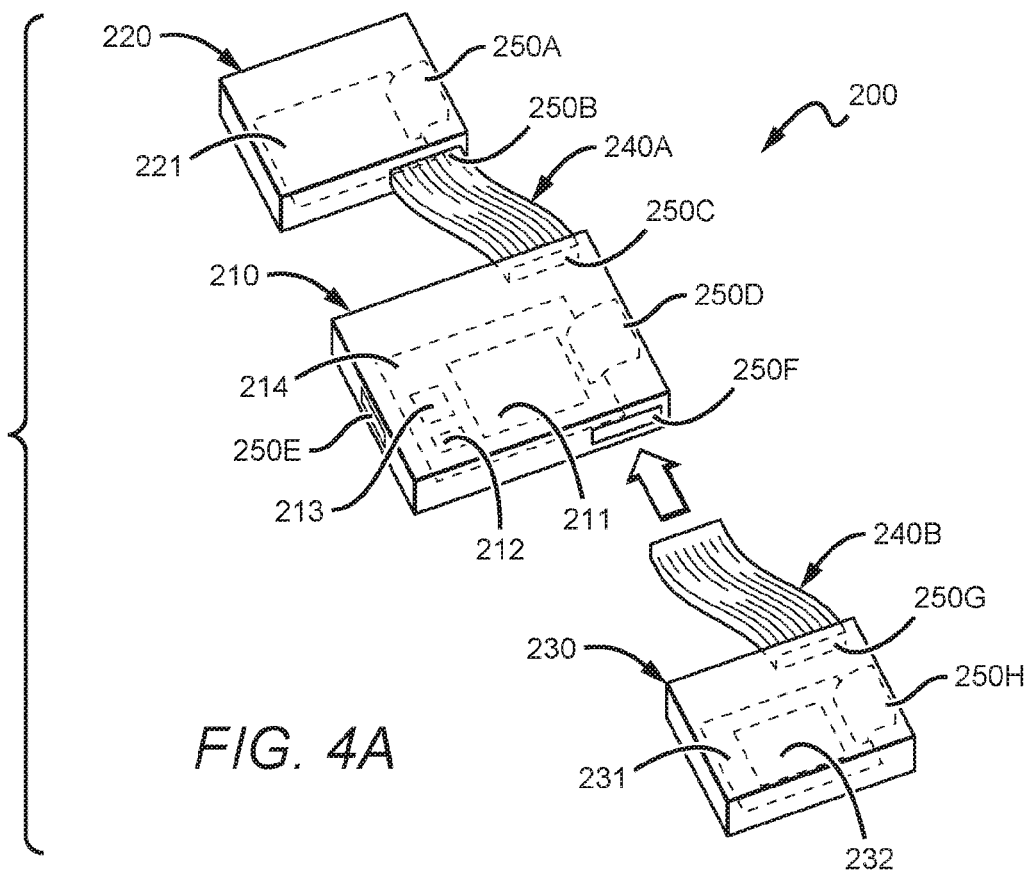
FIG. 4A
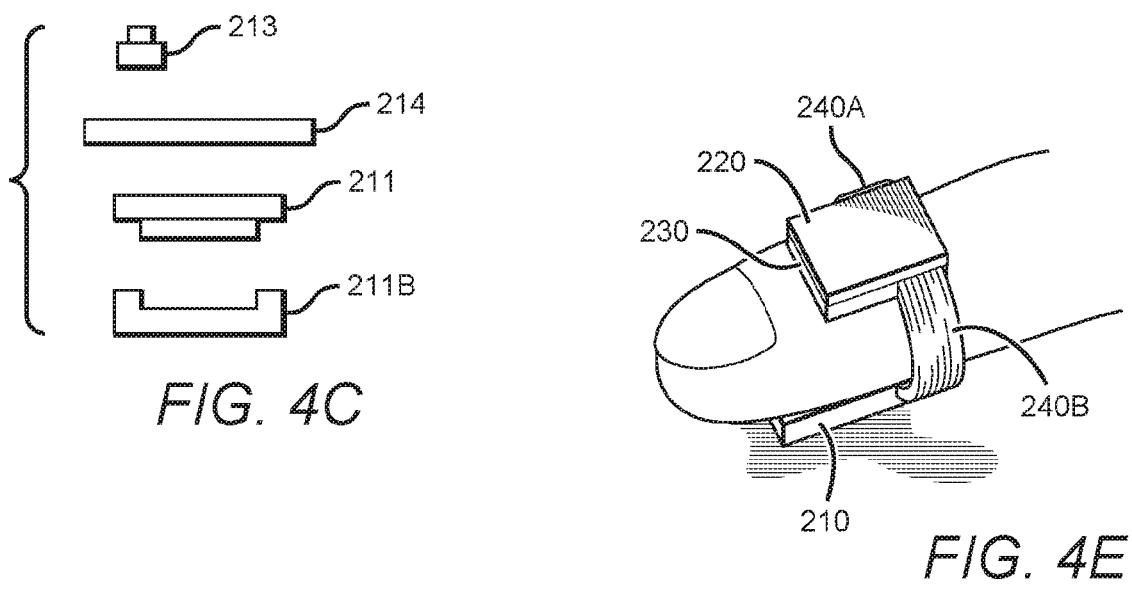
FIG. 4C
FIG. 4E

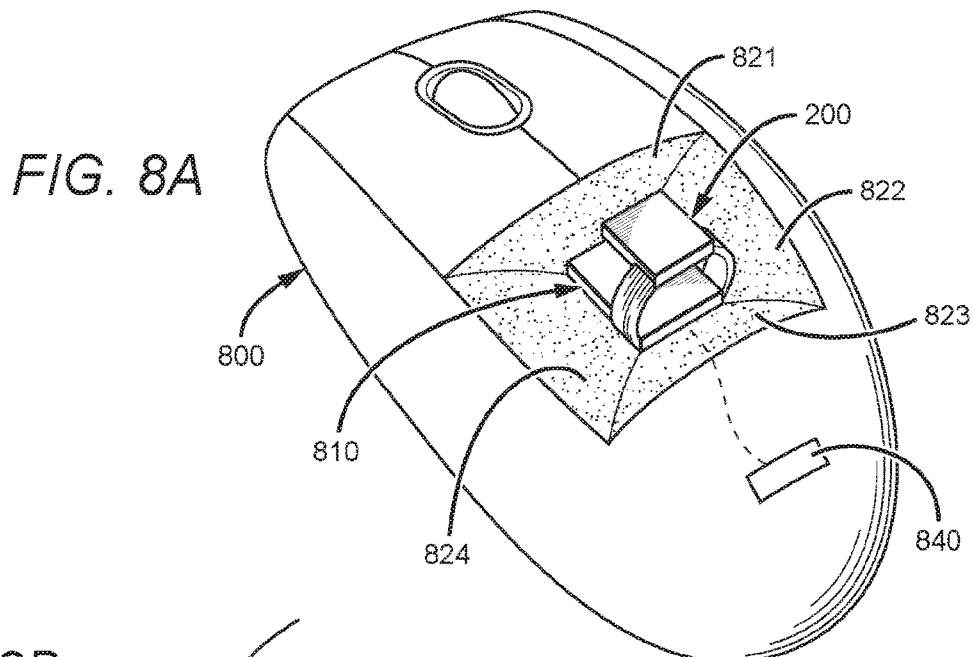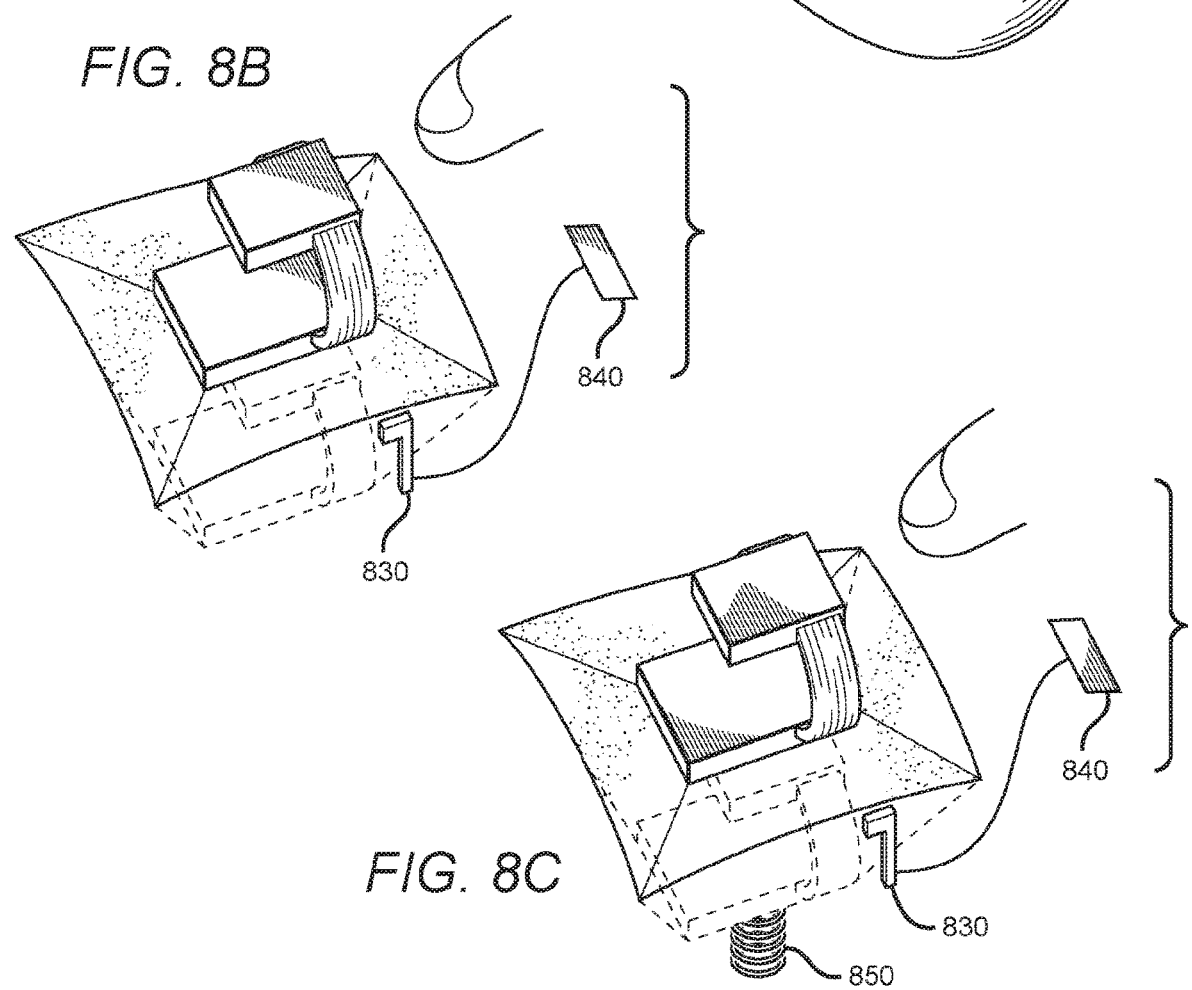

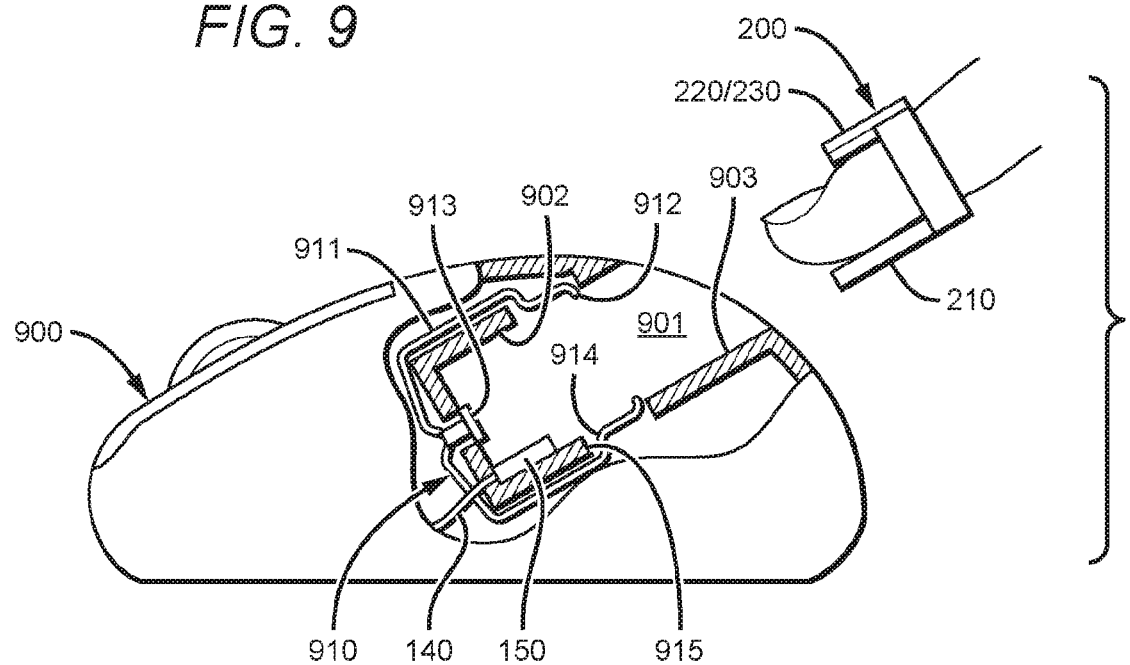
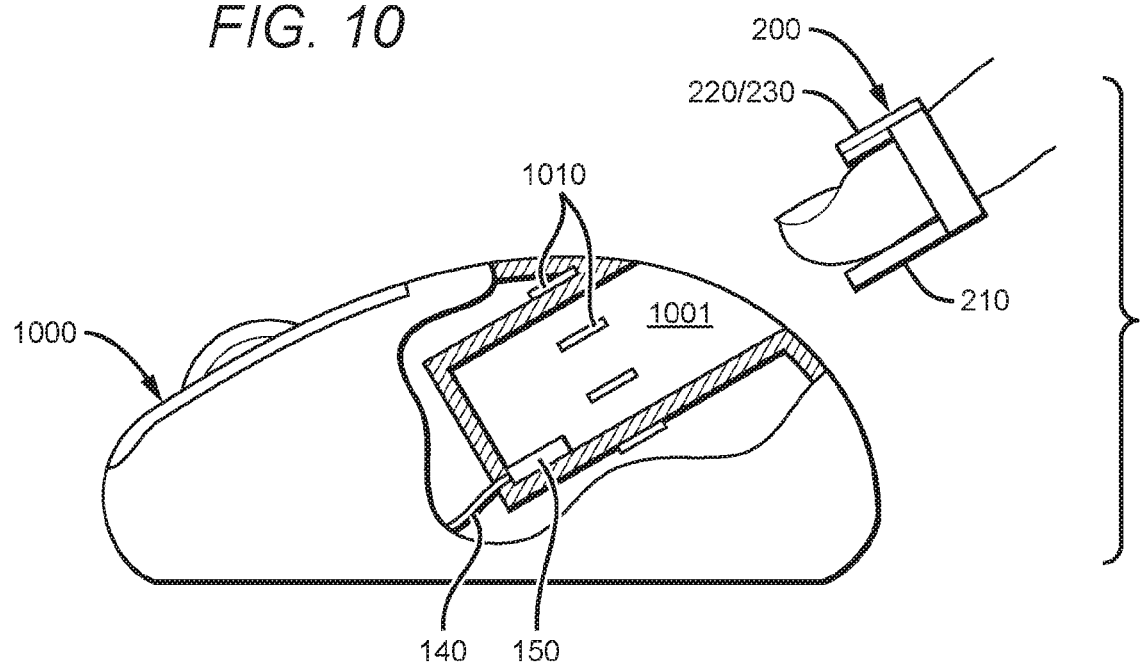

MULTIPURPOSE COMPUTER MOUSE

This application claims priority to U.S. provisional application 62/280,113, filed Jan. 18, 2016. U.S. provisional application 62/280,113 and all other extrinsic references contained herein are incorporated by reference in their entirety.

FIELD OF THE INVENTION

The field of the invention is computer input devices.

BACKGROUND

The background description includes information that may be useful in understanding the present invention. It is not an admission that any of the information provided herein is prior art or relevant to the presently claimed invention, or that any publication specifically or implicitly referenced is prior art.

The standard, table-top computer mouse has long been an essential tool for computer users. The relatively simple hardware design and method of use—translation of the movement of the mouse along a surface into a corresponding two-dimensional space of a computer screen—makes it an intuitive tool that is easy to learn and use for computer users of all ages.

The traditional computer mouse is relegated to movement along a two-dimensional plane. While this is sufficient for most applications, it presents limitations in certain uses.

For example, teachers, key note speakers, and other presenters often desire mobility and need a mouse that can be operated away from desks or podiums. Nascent virtual reality and augmented reality technologies are increasingly requiring input devices that can not only perform the functions of a traditional desktop mouse, but also additional functions to navigate the 3D environments that these technologies make possible, including those that allow or even require a user to move around in a real-world space.

Devices such as the one disclosed in U.S. pre-grant publication 2014/0098067 to Yang, et al attempt to capture the functionalities of a mouse through finger instrumentation. However, for traditional computer applications, many users are accustomed to the traditional mouse input and having a finger device alone greatly limits the functionalities when mobility is not required. Covering both the traditional methods of mouse input and input technologies for three-dimensional space applications have required a user to use multiple, separate devices and then switch between them. This process is cumbersome, expensive, and requires space for all of these distinct devices.

Thus, there is still a need for a system that allows a user to simply and seamlessly transition from the two-dimensional table-top mouse input to a three-dimensional input device and back as the need arises.

SUMMARY OF THE INVENTION

The inventive subject matter provides apparatus, systems and methods in which a finger-wearable input device unit can be docked within a mouse frame housing for traditional table-top, mouse-based operation and removed for computer input operations in three-dimensional space.

The inventive subject matter includes a mouse frame configured having a cavity or opening within which the finger-wearable unit can be docked such that the combined frame and docked finger-wearable unit can be used as a traditional mouse. The mouse frame includes a docking slot that holds the finger-wearable unit in place while docked, and provides a data connection between the frame and the docked unit such that the signals from the various components of the frame (e.g., mouse buttons, scroll wheel, etc.) are passed to a microprocessor of the finger-wearable unit for processing and transmission to the host computer for execution by the host computer (e.g., cursor movement, button press or other user input).

In embodiments of the inventive subject matter, the cavity of the mouse frame can includes surfaces or mechanisms that assist the user in installing and removing the finger-wearable unit from the mouse frame. In embodiments, the docking slot is on a surface separate from the mini-PCB board of the mouse frame, and is actuated by a spring to raise at an angle when the cover of the mouse frame is lifted so as to present the finger-wearable unit for removal at an easily-accessed position. In embodiments, the cavity of the mouse frame includes a channel such that a user can slide the finger-wearable unit into docking. In other embodiments, the surfaces of the cavity of the mouse frame are tapered to provide a guide towards the docking slot for easy, precise installation.

In embodiments, the mouse frame can include a mechanism, such as an inverted-pyramid mechanism, whereby the finger-wearable unit is lowered into a docking position within the frame and raised from the docking position for removal.

The finger-wearable unit includes a sensor module that houses an optical navigation sensor and three-dimensional movement sensor (such as a three-axis accelerometer or a gyroscope) that enable the finger-wearable unit to detect movement along a surface as well as along three-dimensional space. In embodiments, the docking slot of the mouse frame extends through an opening on the bottom of the mouse frame such that the optical navigation sensor of the finger-wearable unit is utilized to track movement across the surface while the unit is docked within the mouse frame and used in traditional desktop mode. The sensor module also includes at least one micro-switch and/or touch sensor that can detect a user input via actuation.

The finger-wearable unit also includes additional modules that house the microcontroller and wireless communication hardware (modules and antennas), and a battery distributed among the additional modules. In embodiments, the additional modules can also include touch sensors or micro-switches.

The sensor module is connected to the additional modules via flexible connector links. The links can, in embodiments, comprise wires or flexible mini-PCBs. In embodiments the links are made from or coated in an elastic material that has a bias towards curling. In embodiments, the links can include touch sensors, enabling user input via contact with the links.

In embodiments, the modules and links of the finger-wearable unit are separable, with each module having a plurality of connector points to which the links can be attached. Thus, the finger-wearable unit can be arranged in a plurality of configurations depending on the use or user need.

The modules of the finger-wearable unit can also include additional components such as biometric sensors, transducers for charging, etc.

The finger wearable unit can include one or more connectors that allow it to be connected with additional modules that provide additional functionality, such as covers that can provide game controller inputs.

Various objects, features, aspects and advantages of the inventive subject matter will become more apparent from the following detailed description of preferred embodiments, along with the accompanying drawing figures in which like numerals represent like components.

All publications identified herein are incorporated by reference to the same extent as if each individual publication or patent application were specifically and individually indicated to be incorporated by reference. Where a definition or use of a term in an incorporated reference is inconsistent or contrary to the definition of that term provided herein, the definition of that term provided herein applies and the definition of that term in the reference does not apply.

The following description includes information that may be useful in understanding the present invention. It is not an admission that any of the information provided herein is prior art or relevant to the presently claimed invention, or that any publication specifically or implicitly referenced is prior art.

In some embodiments, the numbers expressing quantities of ingredients, properties such as concentration, reaction conditions, and so forth, used to describe and claim certain embodiments of the invention are to be understood as being modified in some instances by the term "about." Accordingly, in some embodiments, the numerical parameters set forth in the written description and attached claims are approximations that can vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the invention are approximations, the numerical values set forth in the specific examples are reported as precisely as practicable. The numerical values presented in some embodiments of the invention may contain certain errors necessarily resulting from the standard deviation found in their respective testing measurements.

Unless the context dictates the contrary, all ranges set forth herein should be interpreted as being inclusive of their endpoints and open-ended ranges should be interpreted to include only commercially practical values. Similarly, all lists of values should be considered as inclusive of intermediate values unless the context indicates the contrary.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

The recitation of ranges of values herein is merely intended to serve as a shorthand method of referring individually to each separate value falling within the range. Unless otherwise indicated herein, each individual value is incorporated into the specification as if it were individually recited herein. All methods described herein can be performed in any suitable order unless otherwise indicated herein or otherwise clearly contradicted by context. The use of any and all examples, or exemplary language (e.g. "such as") provided with respect to certain embodiments herein is intended merely to better illuminate the invention and does not pose a limitation on the scope of the invention otherwise claimed. No language in the specification should be construed as indicating any non-claimed element essential to the practice of the invention.

Groupings of alternative elements or embodiments of the invention disclosed herein are not to be construed as limitations. Each group member can be referred to and claimed individually or in any combination with other members of the group or other elements found herein. One or more members of a group can be included in, or deleted from, a group for reasons of convenience and/or patentability. When any such inclusion or deletion occurs, the specification is herein deemed to contain the group as modified thus fulfilling the written description of all Markush groups used in the appended claims.

BRIEF DESCRIPTION OF THE DRAWING

FIG. 3A illustrates the internal components of the mouse frame, according to embodiments of the inventive subject matter.

FIG. 3B illustrates the internal components of the mouse frame whereby a docking surface can be actuated, according to embodiments of the inventive subject matter.

FIG. 3C illustrates an alternative embodiment of the internal components of the mouse frame shown in FIG. 3A.

FIG. 4A provides an isometric view of the finger-wearable unit, according to embodiments of the inventive subject matter.

FIG. 4C is an exploded view of components of the sensor module of the finger-wearable unit, according to embodiments of the inventive subject matter.

FIG. 4E shows the finger-wearable unit as worn on a user's finger.

FIG. 8A illustrates another embodiment of the mouse frame.

FIG. 8B is an isolated view of the docking mechanism of the embodiment of FIG. 8A FIG. 8C illustrates an alternative embodiment of the docking mechanism of FIGS. 8A-8B FIG. 9 illustrates another embodiment of the mouse frame.

FIG. 10 illustrates another embodiment of the mouse frame.

DETAILED DESCRIPTION

Figure 1A:
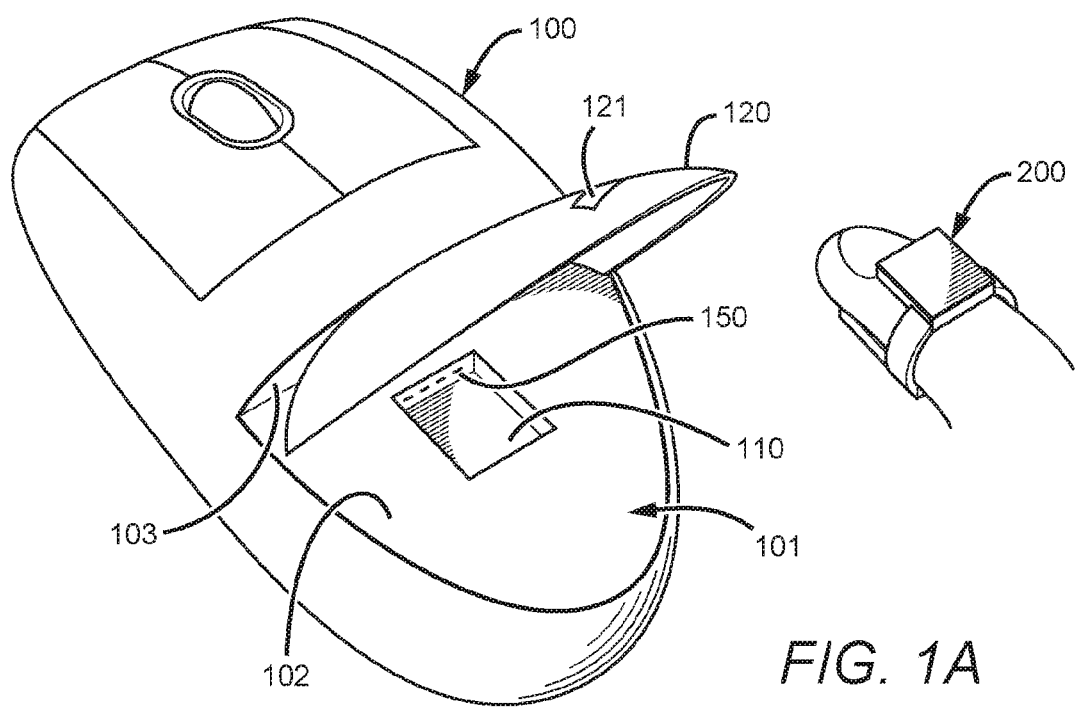
FIG. 1A illustrates the mouse frame with the docking slot visible, and the finger-wearable unit worn on a user's finger, according to aspects of the inventive subject matter.

Throughout the following discussion, numerous references will be made regarding servers, services, interfaces, engines, modules, clients, peers, portals, platforms, or other systems formed from computing devices. It should be appreciated that the use of such terms, is deemed to represent one or more computing devices having at least one processor (e.g., ASIC, FPGA, DSP, x86, ARM, ColdFire, GPU, multi-core processors, etc.) programmed to execute software instructions stored on a computer readable tangible, non-transitory medium (e.g., hard drive, solid state drive, RAM, flash, ROM, etc.). For example, a server can include one or more computers operating as a web server, database server, or other type of computer server in a manner to fulfill described roles, responsibilities, or functions. One should further appreciate the disclosed computer-based algorithms, processes, methods, or other types of instruction sets can be embodied as a computer program product comprising a non-transitory, tangible computer readable media storing the instructions that cause a processor to execute the disclosed steps. The various servers, systems, databases, or interfaces can exchange data using standardized protocols or algorithms, possibly based on HTTP, HTTPS, AES, public-private key exchanges, web service APIs, known financial transaction protocols, or other electronic information exchanging methods. Data exchanges can be conducted over a packet-switched network, the Internet, LAN, WAN, VPN, or other type of packet switched network.

The following discussion provides many example embodiments of the inventive subject matter. Although each embodiment represents a single combination of inventive elements, the inventive subject matter is considered to include all possible combinations of the disclosed elements. Thus if one embodiment comprises elements A, B, and C, and a second embodiment comprises elements B and D, then the inventive subject matter is also considered to include other remaining combinations of A, B, C, or D, even if not explicitly disclosed.

As used herein, and unless the context dictates otherwise, the term "coupled to" is intended to include both direct coupling (in which two elements that are coupled to each other contact each other) and indirect coupling (in which at least one additional element is located between the two elements). Therefore, the terms "coupled to" and "coupled with" are used synonymously.

As used herein, "communicatively coupled" is intended to refer to a direct or indirect linking or coupling between two or more hardware and/or software components by means that can carry a signal (e.g., wired and/or wireless signal transmission interfaces, via circuits, hardware connections for data exchange, etc.) such that the components can exchange (i.e., send and/or receive) data and/or electrical signals. Thus, two devices that are communicatively coupled may be, but are not necessarily required to be, physically coupled or connected (e.g., a wired or other hardware connection versus a wireless communication link).

FIG. 1A provides shows of the mouse frame 100 and the finger-wearable input unit 200 (collectively referred to as computer input system or mouse system 10), according to embodiments of the inventive subject matter.

FIG. 1A illustrates the mechanical assembly of the mouse frame 100 that allows a user to easily release and reattach the finger-wearable input unit 200. As seen in FIG. 1A, the mouse frame 100 includes an opening or cavity 101 at the rear end of the frame 100 that allows a user to detach the finger-wearable unit 200 from frame 100 and reinsert it back to the mouse frame 100 after use. In the embodiments shown here, the cavity has a bottom surface 102 and an end surface 103, extending inward from the surface of the mouse frame 100. In the embodiment illustrated in FIG. 1, the bottom surface 102 of cavity 101 has a docking slot or cavity 110 extending into the bottom surface 102, dimensioned to receive the underside surface of the finger-wearable unit 200 so as to dock the finger-wearable unit 200 within frame 100. The docking slot 110 also provides access to a connection interface 150 of the frame 100, discussed in greater detail below, which enables finger-wearable unit 200 to connect with the frame 100 and provide traditional desktop mouse functionality via the frame 100 when the unit 200 is docked within frame 100. In embodiments, the docking slot 110 can include one or more magnetic surfaces (or magnets within frame 100 disposed underneath the surface(s) of docking slot 110) that attract the corresponding surface of finger-wearable unit 200, assisting with the docking process and helping to keep the finger-wearable unit 200 secure while it is docked within frame 100.

The embodiment of FIG. 1A shows a rectangular docking slot 110 dimensioned to fit the corresponding underside surface of the finger-wearable unit 200, whereby the finger-wearable unit 200 is lowered into the slot 110 for docking and raised from the slot 110 for removal. In the embodiment illustrated in FIG. 1B, the docking slot 110 can comprise a channel or groove depressed into the bottom surface 102 and extending rearward towards the edge of the cavity 101 such that the corresponding underside portion of the finger-wearable unit 200 is introduced into the channel sometime prior to the actual docking position 111 (i.e., the space where the finger-wearable unit 200 sits when it is docked) and then be slid into proper place for docking.

Figure 1B:
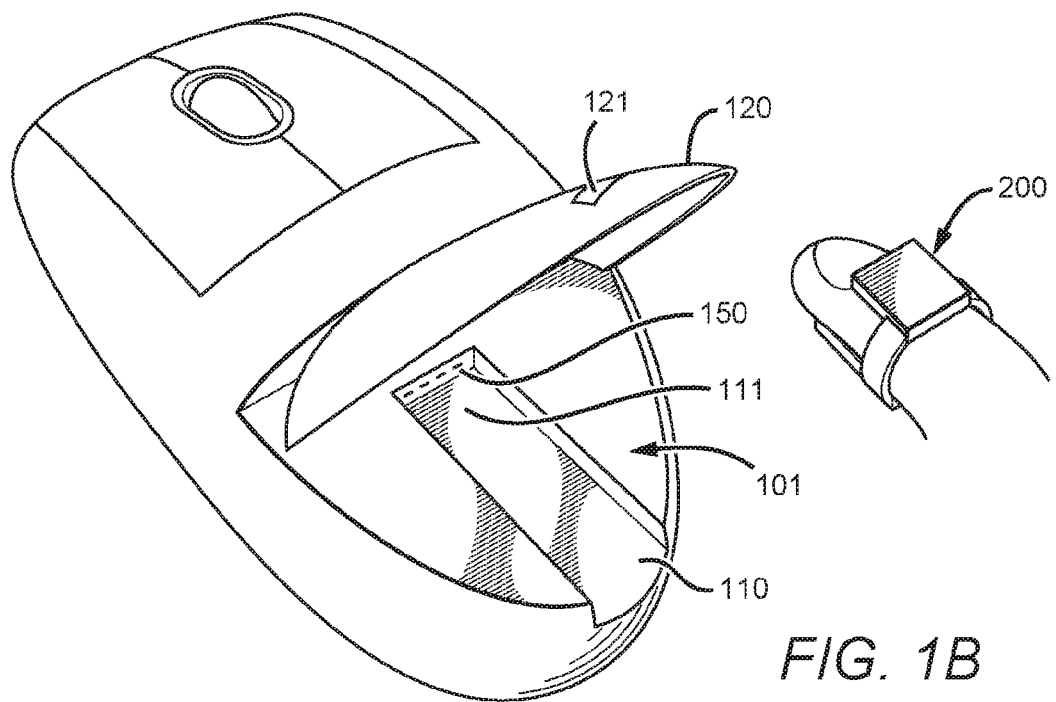
FIG. 1B illustrates a variation of the docking slot of the mouse frame, according to embodiments of the inventive subject matter.

In FIG. 1B, the width of the docking slot 110 is shown as being substantially uniform. However, it is contemplated that the sides of docking slot 110 are non parallel starting from the edge of the frame and converging as they go inward toward the docking position 111, such that width of the docking slot 110 narrows as it gets closer to the docking position 111, reducing the precision required by the user to introduce the finger-wearable unit 200 into the docking slot 110 channel to dock. The width of the docking slot 110 is consistent at the docking position 111 so as to firmly secure the finger-wearable unit 200 and prevent it from moving laterally within the frame 100.

In these embodiments, magnetic coupling such as discussed herein can be used to keep the docked finger-wearable unit 200 in place while docked. In a variation of these embodiments, the recess of the channel can be of a slightly less deep dimension than the recess at the actual docking position of docking slot 110. In these embodiments, finger-wearable unit can be slid toward the docking position via the channel, and then drops slightly into place within the deeper recess of docking slot 110.

Figure 1C:
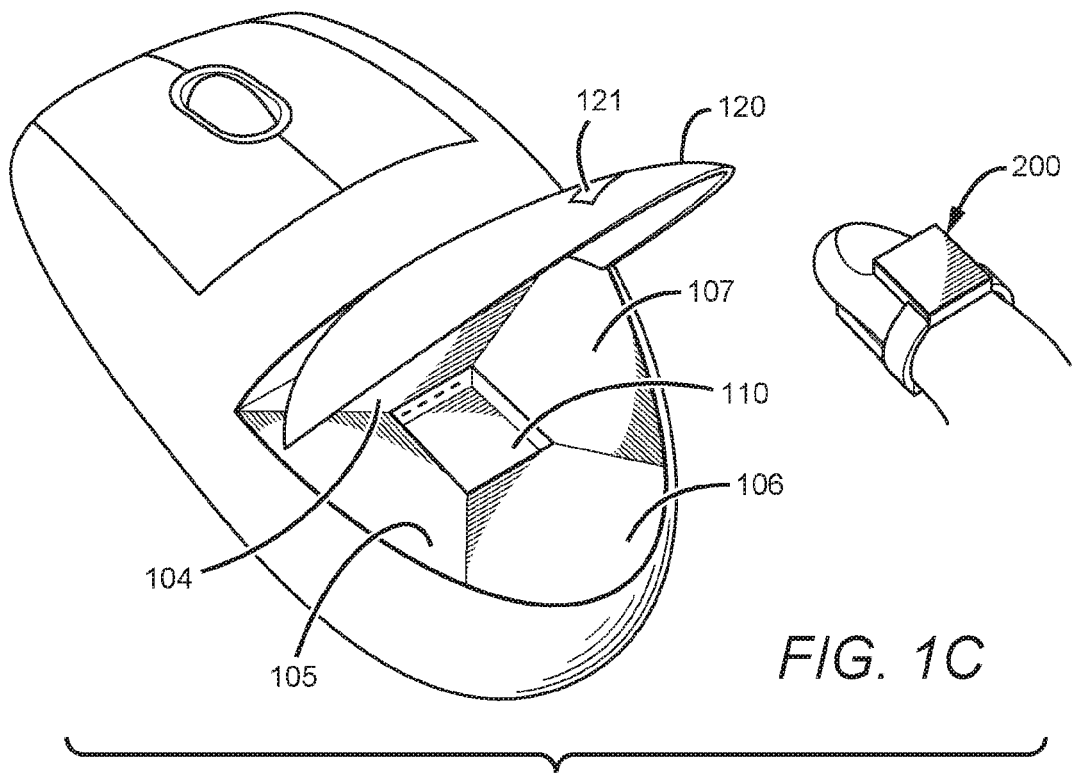
FIG. 1C illustrates a variation of the surfaces of the cavity of the mouse frame, according to embodiments of the inventive subject matter.

FIG. 1C illustrates an embodiment where the side surfaces 104, 105, 106, 107 of the cavity 101 are tapered inward from the outer edges of the cavity 101 to the edges of the docking slot 110 so as to provide a guide for a user reinserting the unit 200 into the frame 100, lowering the manual precision required by the user to properly reinsert and dock the unit 200 within frame 100.

The frame 100 can include a cover or door 120 that covers the cavity 101 when closed, preserving the "natural" shape of the mouse and protecting the finger-wearable unit 200 while it is docked within the frame 100. In the embodiment illustrated in FIG. 1, the cover 120 is a hinged cover that pivots upwardly to allow access to the frame 100. In this illustrated embodiment, the cover 120 and a corresponding location on the frame 100 can include a latch mechanism (not shown) to securely close the cover 120 when it is lowered. The latch mechanism component on the cover 120 includes a button 121 that releases the latch mechanism, allowing the user to open the cover 120 of the mouse frame 100. In embodiments, the frame 100 can also include a spring mechanism (in the form of a spring hinge, or other types of springs) that biases the cover 120 to an open position when the latch mechanism is released.

In other embodiments, the frame 100 and cover 120 do not include a latch mechanism. In these embodiments, cover 120 can be manually opened or closed, and can further include a hinge that provides resistance to movement such that the cover 120 stays in a closed position when lowered by the user.

In the illustrated examples of FIG. 1A-1C, the docking slot 110 is considered to have a bottom surface that assists in the support of the docked finger-wearable unit 200. In these embodiments, the mouse frame 100 is considered to have its own on-board navigation sensor hardware (e.g., optical navigation sensor or ball-based navigation sensor) that communicates its signals to the unit 200 when the unit 200 is docked. However, in other embodiments, the docking slot 110 is a perforation that extends through the bottom of the mouse frame 100, exposing the sensor module 210 of the unit 200 to the surface underneath for the purposes of sensing the movement of the mouse system 10 along the surface. This eliminates the need to have dedicated on-board navigation sensor hardware in the frame 100. In these embodiments, the surfaces of the cavity 101 and docking slot 110 are dimensioned and arranged within frame 100 such that the bottom of the sensor module 210 of unit 200 is held parallel to the bottom of the mouse frame, with sufficient clearance to the surface below the frame 100 as required for the optical-navigation sensor of the unit 200 to properly operated (for example, many existing optical-navigation sensors require about a 2.4 millimeter clearance from the surface underneath). The opening on the underside of the mouse frame 100 may be covered by a transparent material or lens that does not interfere with the sensor of the unit 200 but maintains the continuous smooth surface of the underside of mouse frame 100 to prevent snagging and accumulation of dust or other debris. In these embodiments where the sensor module 210 of the is used to detect the movement while docked, and where docking slot 110 extends through the bottom of the mouse to expose the underside of sensor module 210 to detect the surface below the mouse frame 100, the unit 200 is charged via the wired connection through connector 150. In other words, the underside of mouse frame 100 includes an opening aligned with the docking slot 110 to expose the sensor module 210 to detect the surface below the mouse frame 100. In embodiments of the mouse frame where surfaces of other modules of the unit 200 contact the frame while docked, the wireless charging features discussed above can be implemented accordingly.

Figure 2:
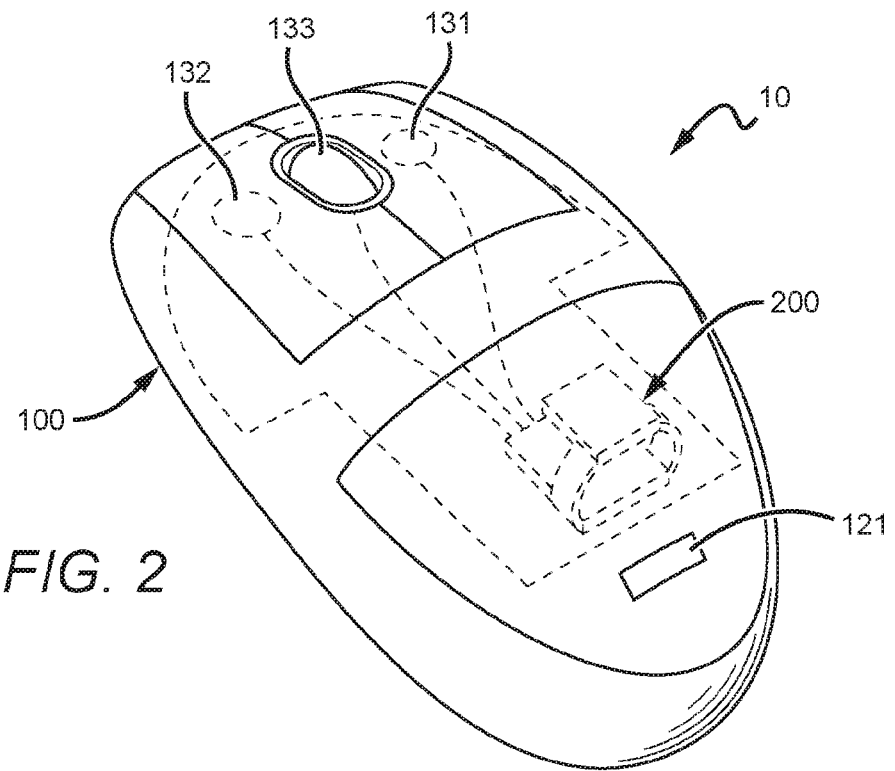
FIG. 2 shows the finger-wearable unit docked within the mouse frame.

FIG. 2 provides illustrates the finger-wearable unit 200 docked inside a mouse frame 100, such that the combined unit functions like standard desktop mouse.

As shown in FIG. 2, the described configuration is able to function as a typical desktop mouse once connected with a host device through a low-energy wireless solution such as but not limited to Bluetooth, WiFi or through a wired connection using a standard connector between mouse frame 100 and a host device. Once the connection is established and suitable drivers are installed on the host machine the user is be able to control the pointer by moving the combined system 10 across a surface. When utilizing the finger-worn unit 200 separately, the user can control a pointer or other movement-based functions by moving the finger in air or sliding a finger across a surface.

As used herein, a "host computer" or "host device" is considered to be the computing device to which the system of the inventive subject matter is connected or paired with as discussed herein to provide a control input interface thereto. Examples of host devices include but are not limited to laptops, desktops, server computers, tablets, smart phones, gaming consoles, augmented reality systems and virtual reality systems.

As will be discussed in greater detail below with regard to the finger-wearable unit 200, the processing associated with the executions of the table-top mouse functions when the finger-wearable unit 200 is docked within mouse frame 100 are executed by the finger-wearable unit's microcontroller 231. Thus, the various input components (e.g., buttons, scroll wheel, movement detection mechanism) and data exchange components (e.g., data connection with connected computer) of the mouse frame 100 are communicatively coupled with the finger-wearable unit 200 such that the finger-wearable unit 200 receives the signals from the input components and can exchange data (e.g., send input commands, send device drivers, receive updates or other data related to the computer and/or a particular application, etc.) with the computer to which the system 10 is connected.

In the discussion of the finger-wearable unit 200 below, the unit 200 is discussed as having modular, separable components. However, unless specifically noted, or if logic or context of discussion dictates otherwise, the discussion of the frame 100 in combination with the finger-wearable unit 200 can also be considered to encompass non-modular finger-wearable units (i.e., finger-wearable units of a non-separable, fixed construction or assembly). Thus, in embodiments where a fixed ring-shaped finger-wearable unit is contemplated (wrapping partially or wholly around a user's finger allowing the ring to be worn), the unit 200 is considered to have a body that includes a sensor module 210 as discussed herein that is disposed to rest on the underside of the ring shape when worn, and may have additional modules as discussed herein fixably arranged on the ring shaped body structure. Alternatively, the other components discussed herein (e.g., microcontroller, wireless antenna, battery, etc.) may be arranged within the ring-shaped body structure of the unit.

As seen in FIG. 2, a printed circuit board, such as mini-PCB board 130 is disposed within the mouse frame 100 and houses components to perform the functions of a typical computer mouse such as right click 131, left click 132, and scroll wheel with integrated middle button 133. As will be appreciated by the reader, the mouse frame 100 shown in the illustrative examples here are of the two-button and scroll-wheel variety. However, it is contemplated that other mouse frames could have more or fewer inputs, such as a trackball, additional or fewer buttons, fingerprint scanners, and other input interfaces, such as those that may be found in computer mice designed for gaming, graphic design, or other specialized uses.

FIG. 3A provides an isolated view of the mini-PCB 130 and other components of mouse frame 100, with a docked finger-wearable unit 200, according to an embodiment of the inventive subject matter. The mini-PCB 130 has printed circuit lines to feed all the signals from the various frame input components 131, 132, 133 and data exchange components of the mouse frame 100 to the finger-wearable unit 200 via a frame data connector 150, to which the finger-wearable unit 200 connects when the unit 200 is docked within the mouse frame 100. In the embodiments shown herein, the connector 150 is a zero-insertion force connector, but other suitable connector interfaces are similarly contemplated (e.g., magnetic, etc.).

As seen in FIG. 3A, the mini-PCB board 130 houses all the modular components of the mouse including but not limited to micro-switches for right click 131 and left click 132 (which are coupled to the physical mouse buttons to detect pressing of the corresponding buttons), the scroll wheel with integrated middle button micro-switch 133, a movement sensor (e.g., an optical sensor or, in embodiments, a ball-based movement sensor) connected to the underside of the mini-PCB board (not shown), and any other input components of the mouse frame 100 (e.g., trackball, additional buttons, and/or other input interfaces, etc.). The mini-PCB 130 can also house the components that allow for data exchange with a computer to which the mouse frame 100 is connected. In embodiments such as the illustrative example of FIG. 3A, the mini-PCB 130 includes an industry standard connector such as USB-micro female connector 134. The mouse frame 100 may alternatively include a fixed wired connection that is then connected to mini-PCB 130.

To provide communication from the various components of the mouse frame 100 to the finger-wearable unit 200 (and vice-versa, as may be appropriate), the various components 131, 132, 133, 134 and any other components are connected to a connector 160, and a ribbon cable or a flexible PCB film 140 joins the connector 160 on the mini-PCB board 130 and the connector 150 to which the finger-wearable module 200 is attached.

In embodiments, the cable 140 also provides power from a wired connection (such as a fixed wired connection or a removable connection such a wired USB interface via the connector 134) to the finger-wearable unit 200, thus charging the unit 200 while it is docked within frame 100.

The connection of the various components of frame 100 to the connector 150 is illustrated via cable 140. Though the illustrative examples show mini-PCB 130 as a unitary piece for the purpose of simplicity, using the cable 140 allows for the mini-PCB 130 to be separated or divided such that the section housing the connector 150 and a docking surface for the docked unit 200 can be arranged independently of the section housing the connector 160 and the various component micro switches 131-134, which allows the systems and methods of the inventive subject matter to accommodate mouse frames 100 of various sizes and shapes. In these embodiments, the mini-PCB 130 may only be the section having the components 131-134 and connector 160, and the section housing connector 150 and docking surface may or may not be a PCB, depending on whether any printed circuitry is required on that section.

In embodiments, the mouse frame 100 can include its own battery capabilities, such as a rechargeable on-board battery or an interface for removable batteries. In these embodiments, the battery is coupled with the finger-wearable unit 200 when it is docked within frame 100 (via a cabled or wired connection through connector 160, through a wireless charging interface disposed at docking slot 110, or other power supply interfaces such that the finger-wearable unit 200 can be charged while it is docked within the frame 100 and so that, when the unit 200 is docked within frame 100, it utilizes the battery of frame 100 rather than its own onboard battery for operation.

FIG. 3B provides an isolated view of the internal components of the frame 100 whereby the connector 150 and the docking surface (i.e., the surface, recess or structure upon which the finger-wearable unit 200 rests when docked; for example, can be a space, the docking slot 110 of FIG. 1A, etc.) are disposed on a platform 170 within the cavity 101 that can be angularly raised and lowered to facilitate docking and undocking of the unit 200 within the frame 100.

As seen in FIG. 3B, the platform 170 is actuated by a spring assembly 180 that is biased such that the platform 170 is raised when the spring assembly 180 is released, thus presenting the platform 170 at an angle that allows for easier, more naturally docking and undocking of the finger-wearable unit 200. The spring assembly 180 is illustrated in FIG. 3B as being coupled to the mini-PCB 130, which is fixably disposed within mouse frame 100, but the spring assembly can also be fixed directly to mouse frame 100 or other fixed components therein to be able to provide the biasing force to lift the platform 170. The mouse frame 100 can include a latch mechanism that engages the platform 170 when it is lowered such that the platform 170 is kept in a lowered position within the cavity 101 until the latch is released. The latch can be coupled to an external button that a user can press to release the platform 170. In embodiments, the latch can be mechanically coupled to the open-door button 121, such that both the door 120 and the platform 170 are released simultaneously when the user presses the button. In embodiments, it is contemplated that the door 120 and platform 170 are mechanically linked (e.g., by a single static structural member or static structural assembly coupled with both the door 120 and platform 170) such that the user closing the door 120 to a closed position also lowers the platform 170 to a lowered position where it is engaged by its latch. In embodiments, the cavity 101 and/or platform 170 can be of such dimensions that, when pivoted to the upward position, the platform 170 may partially extend beyond the cavity 101. In the embodiment of FIG. 3B, the pivoting platform 170 could be considered to replace the static bottom surface 102 from FIG. 1A.

As the platform 170 is separated from the PCB 130, the connector 150 is connected to the connector 160 (and thus, the various components 131-134 of the mouse frame 100) via the ribbon cable or the flexible PCB 140. The flexible cable 140 provides the flexibility for the platform 170 housing the finger-wearable unit 200 to move up or down without affecting the communication links between the components of frame 100 and the finger-wearable unit 200.

FIG. 3C shows an alternative embodiment to the components of FIG. 3A. As shown in FIG. 3C, one or more of the components 131-134 of frame 100 can be communicatively connected directly to the connector 150 (and thus, to a docked finger-wearable unit 200) via the printed circuit of the mini-PCB board 130 itself, without connecting via the cable or ribbon 140 of FIG. 3A.

Figure 4B:
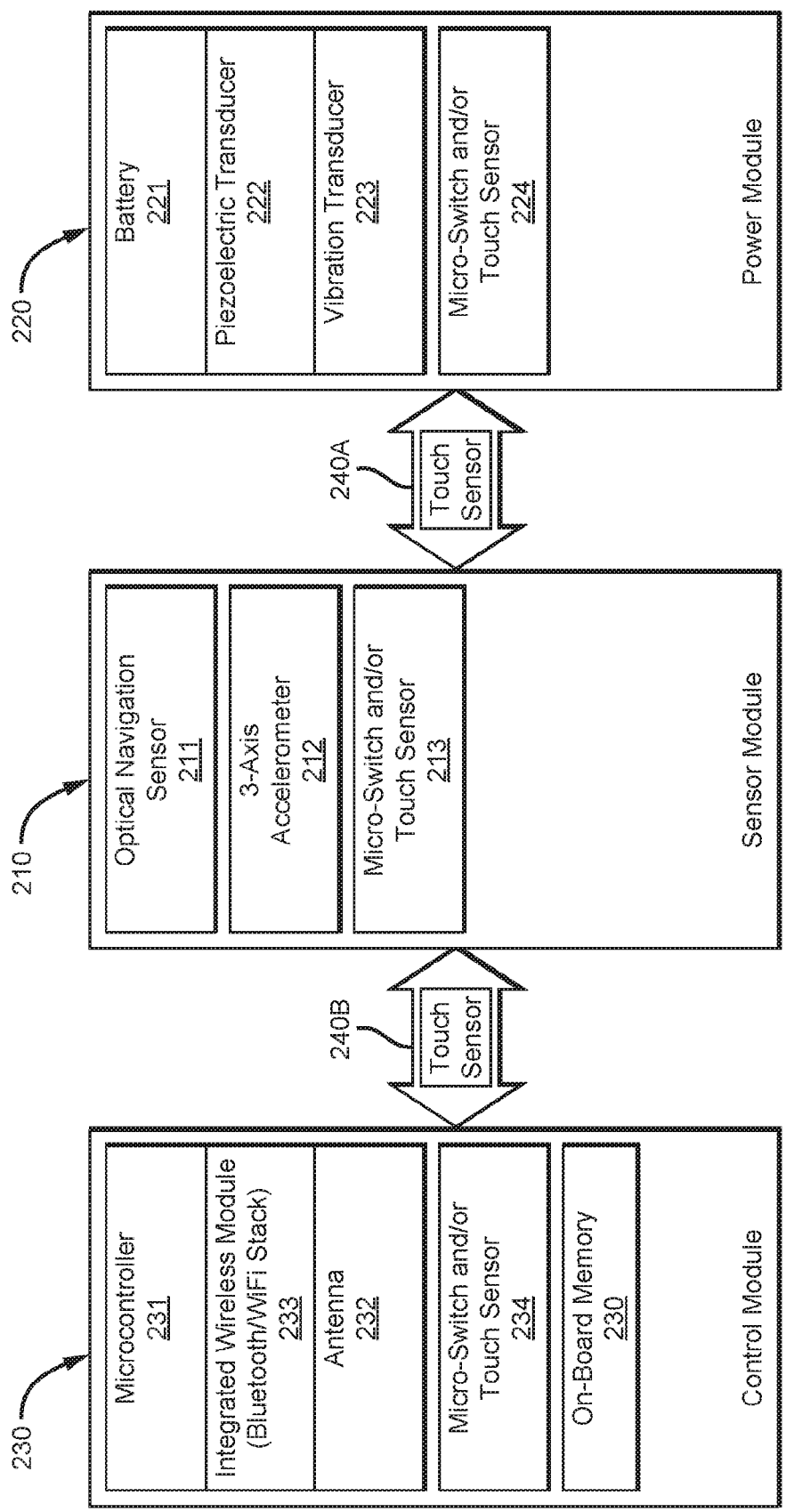
FIG. 4B provides a diagrammatic overview of the finger-wearable unit, according to embodiments of the inventive subject matter.

FIG. 4A and FIG. 4B illustrate the various components of the finger-wearable unit 200, according to embodiments of the inventive subject matter. FIG. 4A illustrates an opened (i.e., disconnected from a closed ring shape) finger-wearable unit 200 and FIG. 4B provides a diagrammatic overview of finger-wearable unit 200, according to embodiments of the inventive subject matter. As seen in FIG. 4A, the finger-wearable unit 200 includes a sensor module 210 and secondary modules 220 and 230. The secondary modules 220 and 230 are each coupled to the sensor module 210 via links 240A, 240B, respectively which comprise ribbon cables or flexible PCBs that allow for data exchanges and power transmission between the different modules. In the embodiments illustrated herein, links 240A, 240B are considered to be interchangeable. It should be noted that, for the purposes of clarity in the figures, the illustrations of FIGS. 4A and 4B have some differences in the illustrated components. However, it should be understood that the discussions regarding FIG. 4A and its components are considered to apply to FIG. 4B and vice-versa.

In embodiments, such as those illustrated herein, the components of finger-wearable unit 200 (i.e., the modules 210, 220, 230 and the links 240A, 240B) are separable and can be rearranged in additional configurations. To do so, the modules 210, 220, 230 have a plurality of connectors 250A, 250B, 250C, 250D, 250E, 250F, 250G and 250H as shown in FIG. 4A that allow the links 240A, 240B to connect thereto. The connectors can be industry-standard connectors, such as zero-insertion force connectors, pin-and socket connectors, magnetic connectors, and/or other connector interfaces. As seen in FIG. 4A, the module 230 connected to link 240A via connector 250G which is separated from module 210 but will be connected via connector 250F.

The sensor module 210 can be considered to be the "main" module in that it houses the sensors used to track the movement of the finger-wearable unit 200 in two-dimensional as well as three-dimensional space. As shown in FIG. 4A, the sensor module 210 houses the mouse navigation sensor 211 (also referred to herein as the two-dimensional navigation sensor 211) to track 2D movements of finger (along a first and second axis of a plane, such as a surface) and a three-dimensional navigation sensor 212 to track 3D movements of finger (along all three axis of movement). In the embodiments illustrated herein, the two-dimensional navigation sensor 211 is considered to be an optical navigation sensor, and the three-dimensional navigation sensor 212 is considered to an accelerometer (though other suitable three-dimensional navigation sensors such as gyroscopes are also contemplated). The sensor module 210 also includes one or more unit input detection components 213. In the illustrative embodiments shown herein, the unit input detection component 213 is considered to be a micro-switch 213 (assigned to correspond to clicking functions; for example left-click functions as a default). However, it is contemplated that other suitable unit detection components 213 can be used, such as capacitive or resistive touch sensors. These components are housed on a flex or rigid-flex PCB board 214. The sensor module 210 also has unit data connectors (connection interfaces) 250C, 250D, 250E, and 250F to which additional sensors or modules can be attached.

The unit data connector 250E of sensor module 210 is configured to connect with the corresponding frame connector 150 of the mouse frame 100 and other modules (such as the external cover of FIG. 6 discussed in greater detail below) to expand the capabilities of the finger-wearable unit 200. Thus, in embodiments, the connector 250E can be of the same type, standard, or protocol as the connectors 250C, 250D and 250F. In other embodiments, the connectors 250C, 250D, 250F are only used to connect to the other modules 220, 230 and, as such, the connector 250E can be of a different type, standard or protocol from the connectors 250C, 250D, 250F due to different data exchange requirements.

As shown in FIGS. 4A and 4B, module 230 (also referenced herein as the "control module") includes a microcontroller 231 that includes integrated wireless communication hardware module 233 (e.g., a Bluetooth/WiFi stack shown here, but other wireless communication interfaces are also contemplated, such as NFC, other industry-standard wireless protocols currently existing and developed in the future, proprietary wireless protocols, etc.) and chip antenna 232. In embodiments, the module 230 can include a separate antenna 232 if it is not integrated with the microcontroller 231. In embodiments, the module 230 can also include on-board memory 235 (e.g., flash, RAM, etc.) that can store drivers, user configuration data, and other instructions executable by microcontroller 231 to enable the various functions and processes of the inventive subject matter.

In the embodiment shown, the finger-wearable unit 200 establishes and maintains the wireless connection with the host computer via its on-board wireless communication interface module 233 (e.g., Bluetooth) and communicates directly with the host computer via the host computer's corresponding wireless communication protocol or, if the host computer does not natively support a suitable wireless communication protocol, through a wireless dongle that can be connected to the host computer. Thus, in the embodiments illustrated herein, the finger-wearable unit 200 communicates with the host computer directly when undocked and also when docked within frame 100. However, if the frame 100 is connected to the host computer via a wired connection (either fixed or removable), the finger-wearable unit 200 can be programmed to instead rely on the wired connection via the frame 100.

In other embodiments, the frame 100 can include its own corresponding wireless communication hardware and antenna whereby the frame 100 serves to relay the signals from the finger-wearable unit 200 to the host computer and vice-versa. In these embodiments, the frame 100 can also communicate with the host computer via its wireless communication hardware or via a wired connection to relay the communications to and from the unit 200.

Module 220 (also referenced herein as the "power module") contains a battery 221 that can be recharged by docking the finger-wearable unit 200 within the mouse frame 100. In embodiments, the power module 220 can also include one or more transducers that allow for the unit to be charged during use. For example, the power module 220 can include a piezoelectric transducer 222 that can harvest energy from the surface of the user's skin and/or vibration transducers 223 that can harvest energy from pulse and movements of the unit 200 during use.

In embodiments, the finger-wearable unit 200 can include a wireless charging component in the sensor module 210 (or any other module used to contact the mouse frame 100 when the finger-wearable unit 200 is docked). In these embodiments, the docking slot 110 includes a corresponding wireless charging component such that the finger-wearable unit 200 can charge via wireless charging rather than via a cabled connection.

The modules 220, 230 are also each also contemplated to have a mini-PCB and/or other data and power conduits that allow for the pass-through of signals and/or power through the module to other modules.

The sensor module 210 detects, via the navigation sensor 211 and/or the accelerometer 212, the directional movement of the entire unit 200 to guide the mouse pointer (or other mouse-based movement interaction of an application) on the host machine. The sensor module 210, via the accelerometer 212, is also programmed to track the movement of the finger in three-dimensional space.

The detected motion data is transferred from the sensor module 210 to the control unit 230 for processing. The microcontroller 231 in the control unit process this directional data and creates a payload per an established protocol stack such as but not limited to Bluetooth, WiFi and transmit the data over wireless link established with the host machine. In embodiments, such as the one illustrated herein, a System on Chip (SoC) microcontroller with integrated wireless chip antenna is used for this application. The software driver or the app on the host machine receives the data and initiates the appropriate user action.

The micro-controller 231 in the control module 230 is programmed to recognize plug-and-play sensors that can be attached to the sensor unit 210, such as via the connector 250E.

In embodiments, each of the modules 220, 230 can also include input components such a micro-switches similar to micro-switch 213 of module 210 and/or a touch sensor on the "outer" surface of the module (i.e., the surface intended to face away from the user's finger when the unit 200 is worn) that can detect touch inputs such as presses or swipes. Similarly, the links 240A, 240B can, in embodiments, include touch sensors on the outer surface in order to provide additional inputs.

In embodiments, the finger-wearable unit 200 can include additional internal sensors distributed among the modules 210, 220, 230, such as location sensors (e.g., GPS, etc.), biometric sensors (e.g., pulse sensors), etc.

FIG. 4C further illustrates some of the components internal to the sensor module 210 in an exploded view. As seen in FIG. 4C, the sensor module 210 includes an optical navigation sensor 211, an optical lens 211B, the flex or rigid-flex PCB board 214, and micro-switch 213. In embodiments, the sensor module 210 can include a touch sensor in addition to or instead of micro-switch 213, to detect tactile inputs by a user.

Figure 4D:
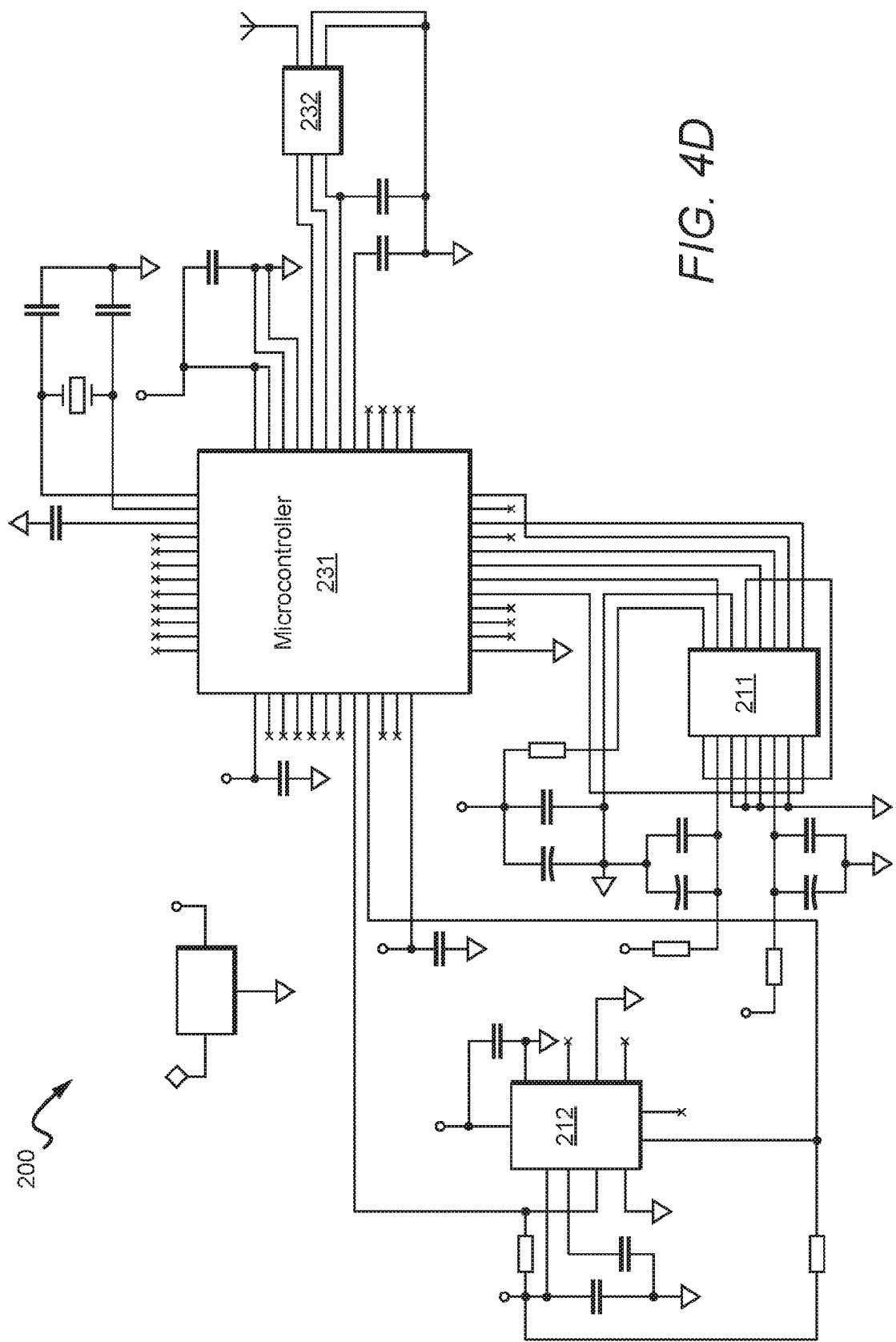
FIG. 4D is an example of an applicable schematic diagram of the internal circuitry of the finger-wearable module, according to embodiments of the inventive subject matter.

FIG. 4D provides an example of a schematic diagram of the internal circuitry of the finger-wearable module 200, according to embodiments of the inventive subject matter. FIG. 4D highlights some of the components in the unit 200, such as the microcontroller 231, optical navigation sensor 211, sensor to track 3D motion 212, and antenna 232.

FIG. 4E illustrates the finger-wearable unit 200 on a user's finger. As seen in FIG. 4E, the links 240A, 240B loop outwardly from the sensor unit 210 to their respective modules 220, 230, which are coupled together to complete the ring shape that wraps around the finger. To be able to fasten together, the modules 220, 230 can use magnetic coupling or mechanical coupling (e.g., protruding tabs or pins of the surface of one of the modules fitting into corresponding cavities on an corresponding surface of the other of the modules). In this arrangement, the sensor module 210 is placed directly underneath the finger enabling a user to slide the sensor across a surface. During table-top use, a user may activate the micro-switch 213 by pressing the module 210 against a surface which will be registered by the host device as a mouse button click or other function assigned to the micro-switch (for example, the default may be a left-click). During use in three-dimensional space, the user may activate the micro-switch 213 by squeezing the module 210 between the finger on which the unit 200 is worn and the user's thumb.

In embodiments, the mechanical coupling mechanism (e.g., the tabs/pins-cavities structure or other mechanical coupling mechanism) can be of a data and power-conductive material, such that when stacked, the modules 220, 230 can exchange data and power via the mechanical coupling. In these embodiments, the links 240A, 240B are then both able to be connected to the same module of the stack (preferably, the bottom module of the stack; in the example of FIG. 4E, it is module 230), ensuring a symmetrically-aligned fit of the ring around the user's finger. It is contemplated that, in embodiments where the links 240A, 240B have a bias to curling, only one link 240A, 240B can be used such that the unit 200 partially wraps around the user's finger while worn as the modules 220, 230 can exchange/transmit data and power to each other via the mechanical coupling.

In embodiments, the ribbon cables or flexible PCBs that comprise links 240A, 240B are made of and/or encased in a stretchable material (e.g., rubber, etc.) that is biased such that the material will curl when at rest. As such, when assembled into the ring shape, the bias of the links 240A, 240B will ensure a proper, secure fit around the user's finger regardless of the user's finger cross-sectional size or shape.

Figure 5A:
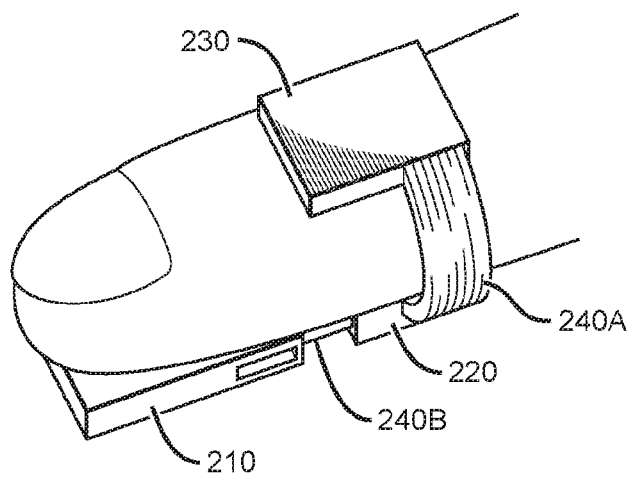
FIG. 5A shows an alternate configuration of the modular components of the finger-wearable unit, according to embodiments of the inventive subject matter.
Figure 5B:
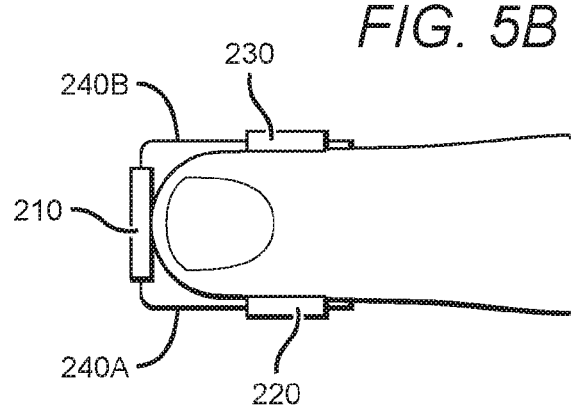
FIG. 5B shows another alternate configuration of the modular components of the finger-wearable unit, according to embodiments of the inventive subject matter.

By having the modules 210, 220, 230 and links 240A, 240B separable, a user may connect the sensor module 210, the control module 220, and the power module 230 in different configurations as illustrated in FIGS. 5A-5B. This allows the user to form different forms of the finger-wearable unit to suit the different user scenarios or for intuitive input in different applications. For example, if the user desires to move the mouse curser or navigate in 3D space in an application by moving the finger in air, the default ring form illustrated in FIG. 4E is suitable.

For certain users, it may be more comfortable to have the unit 200 wrap around their farther away from the fingertip (such as due to finger length and shape). For these users, a configuration such as the one shown in FIG. 5A may be preferable, where the sensor module 210 is still able to be close to the end of their finger for maximum control precision. In these embodiments, the bias of link 240A will keep the unit 200 engaged on the user's finger even though the ring shape does not completely encircle the user's finger. This configuration may also be useful in situations where an external cover needs to be attached to the finger-wearable unit, such as in FIG. 6.

If a user is using the unit 200 in to control a mouse cursor in 2D space by sliding their finger across a surface (such as in a space-limited situation like an aircraft tray-table), the form illustrated in FIG. 5B could be desirable as it allows for the navigation sensor of sensor unit 210 to sit at their fingertip, allowing the user to use a motion similar to that used in a mouse sensor pad of a laptop computer for mouse control.

In embodiments where the links 240A, 240B include touch sensors of their own, other mouse button or other functions can be mapped to these touch sensors such that in the configurations of FIGS. 4C and 5A, other functions (such as the right-click of the mouse) can be actuated by the user touching their thumb to the corresponding link having the function mapped to the touch sensor. For example, if in the configuration of FIG. 4C, the user has the unit 200 on the index finger of their right hand, then the touch sensor of link 240B could be used for the right-click functions by having the user touch the link 240B with their hand.

In the embodiments where links 240A, 240B are data and power conduits only (i.e., have no touch sensors or functionality of their own), the user can place a module 220, 230 in a configuration where it accessible to be pressed or acted upon by the user's thumb or other finger such that the micro-switch or touch sensor of the corresponding module is actuated to execute the function mapped thereto. For example, if the configuration of FIG. 5B is worn by the user on their right index finger, the user could access additional functionality (e.g., a right-click) by pressing on the module 220 sitting on the side of their finger with their thumb.

In embodiments, the microcontroller 231 is programmed to, when the unit 200 is undocked from frame 100, prompt the user to perform an action so as to map a secondary function to a touch sensor or micro-switch of a module 220, 230 or a touch sensor of a link 240A, 240B (if applicable according to certain embodiments of the inventive subject matter). The microcontroller 231 may cause the host computer to which unit 200 is paired to display a prompt. Alternatively, the unit 200 may include a light that may blink or otherwise indicate to the user to take the action. If the unit 200 includes a haptic feedback component, the haptic feedback component may vibrate to inform the user to take an action. The microcontroller 231 is programmed to, in response to the user taking an action, assign that corresponding sensor/micro-switch of module 220, 230 (or, if applicable, link 240A, 240B) to the secondary function and disable the remaining sensors/switches of the unit (other than those of sensor module 210). This approach can also be performed for tertiary and additional input functions to be mapped to different sensor locations of the unit 200. This allows for either a right-handed or a left-handed user to remove the unit 200 from the frame 100 and use it without requiring re-mapping of the input functions from within the application or the host computer's operating system. Additionally, this eliminates unintended inputs from accidental contact with sensors of modules not intended to be used for inputs (e.g., accidental brushing against a sensor location with the middle finger when the input is intended to be between the thumb and index finger while the finger-wearable unit is worn on the index finger).

Figure 6:
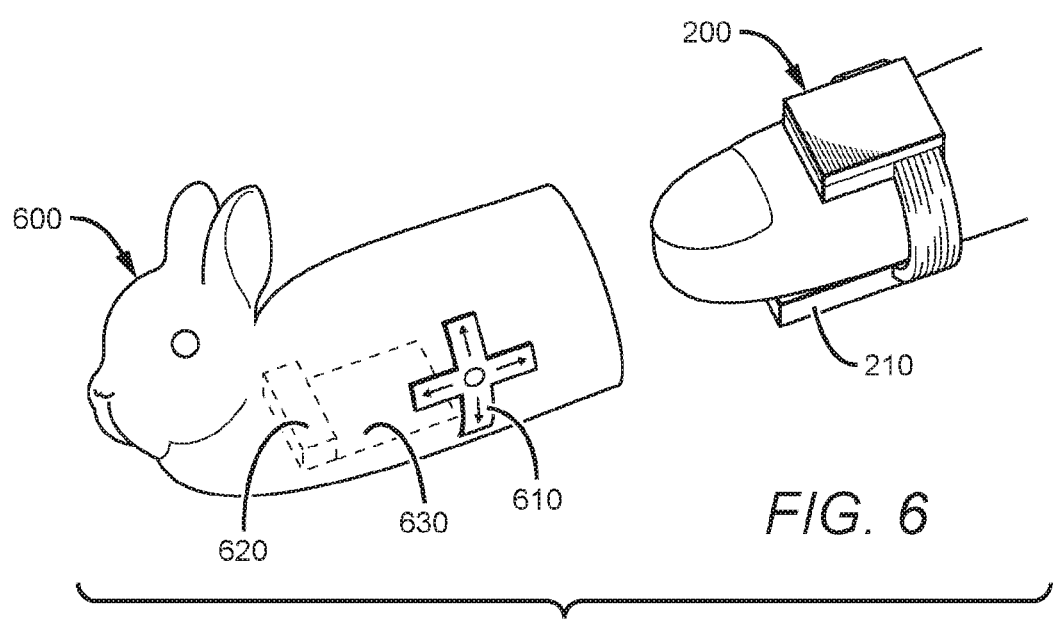
FIG. 6 illustrates a removable cover that can be coupled with the finger-wearable unit, according to embodiments of the inventive subject matter.

FIG. 6 illustrates how the standalone finger-wearable unit 200 can be attached to external cover 600 to provide additional functions, such as via additional control input interfaces 610, additional sensors, etc. In the example illustrated in FIG. 6, the additional control input interface 610 is disposed on the outer surface of the external cover 600. It is contemplated that the additional control interfaces 610 can be control input interfaces 610 beyond those provided by the unit 200 alone and, in some cases, even by the unit 200 docked within frame 100. For demonstration purposes, an embodiment of an external cover 600 in the form of a finger puppet is shown. The cover 600 includes a suitable external cover connector 620 that is aligned to connect with the corresponding mating connector of finger-wearable 200, the external cover connector 620 communicatively coupled to the control input interfaces 610. In this example, the connector 620 of cover 600 is aligned to connect with the connector 250E of the module 210 when the user introduces their finger wearing the finger-wearable unit 200 into the open end of cover 600. Thus, when connected with cover 600 via the connector 620, the unit 200 and at least the section of the user's finger wearing the unit 200 are enveloped within the cavity of cover 600. The connection enables the data flow from the control input interfaces 610, sensors, and other components of external cover 600 to the microcontroller 231 of control module 230 of the finger-wearable unit 200, which can then be provided to a particular application on the host computer for additional control input options. The microcontroller 231 of finger-wearable unit 200 can be programmed to recognize a variety of external covers through a wireless firmware update or a wired update through mouse frame 100. In embodiments, the updated firmware and/or drivers necessary to implement the functionality of the external cover 600 can be include within a memory of the cover 600. In embodiments, the power module 220 of the finger-wearable unit 200 powers for the external cover 600. However, it is contemplated that the external cover 600 can include an additional battery that provides power for its own functions and can also serve to extend the duration of use of the finger-wearable unit 200 before charging is required.

As seen in FIG. 6, one side of external cover 600 includes an input interface in the form of four-way switch 610 that can be operated by user thumb. To support the right hand and left hand combination this switch can be relocated by a plug-and-play mechanism. In embodiments, an opening 630 along one of the side surfaces of the external cover 600 (in this case, the bottom side surface) allows the optical navigation sensor in the sensor module 210 of finger-wearable unit 200 to exposed to a surface. By engaging the four-way switch 610 in the desired direction (up/down/right/left) a user can control the pointer or other action in the host device (e.g., controlling a character or other actions in a video game). The switches can also be programmed to initiate typical pointer actions including but not limited to left click, right click, as well as a back button and home button, depending upon the host operating system and/or application. The control module 230 in the finger-wearable unit 200 takes in the sensor and or control input data from the external cover 600 and transfers it to the host device as previously described through the microcontroller 231 via the integrated Bluetooth/wireless radio module 233 of the finger-wearable unit 200.

The optional external cover 600 is removable so that the user may replace the cover with a variety of other covers to fit their taste of aesthetics which include, but are not limited to, branding from professional sports, popular culture, and industry logos. Various input functionalities can be achieved by input interfaces on these external covers. This allows endless possibilities for customization. A user can select a cover to control his or her favorite app. For example, a good majority of the games uses the control: point and click. By choosing an appropriate external cover, a user can choose the appropriate controls triggers. Highly customizable covers can be provided that implements specific or a combination of operations such as but not limited to swipes, drag and drop, pinch, etc. To implement complex control functions required by some platforms such as Virtual Reality, additional finger-wearable units in multiple fingers can be employed. In this configuration, one finger-wearable module will act as a master and the other units will act as slaves transmitting data to master for processing and transmission to host device.

Other modules or covers that are contemplated can include control input interfaces such analog joysticks, biometric sensors, keyboards or keypads, microphones, cameras, scanners, etc. It is contemplated that the covers can have additional hardware for a variety of uses, such as laser pointers, LED lights or other lights (such as for VR tracking), IR blasters, haptic feedback components, etc.

Figure 7:
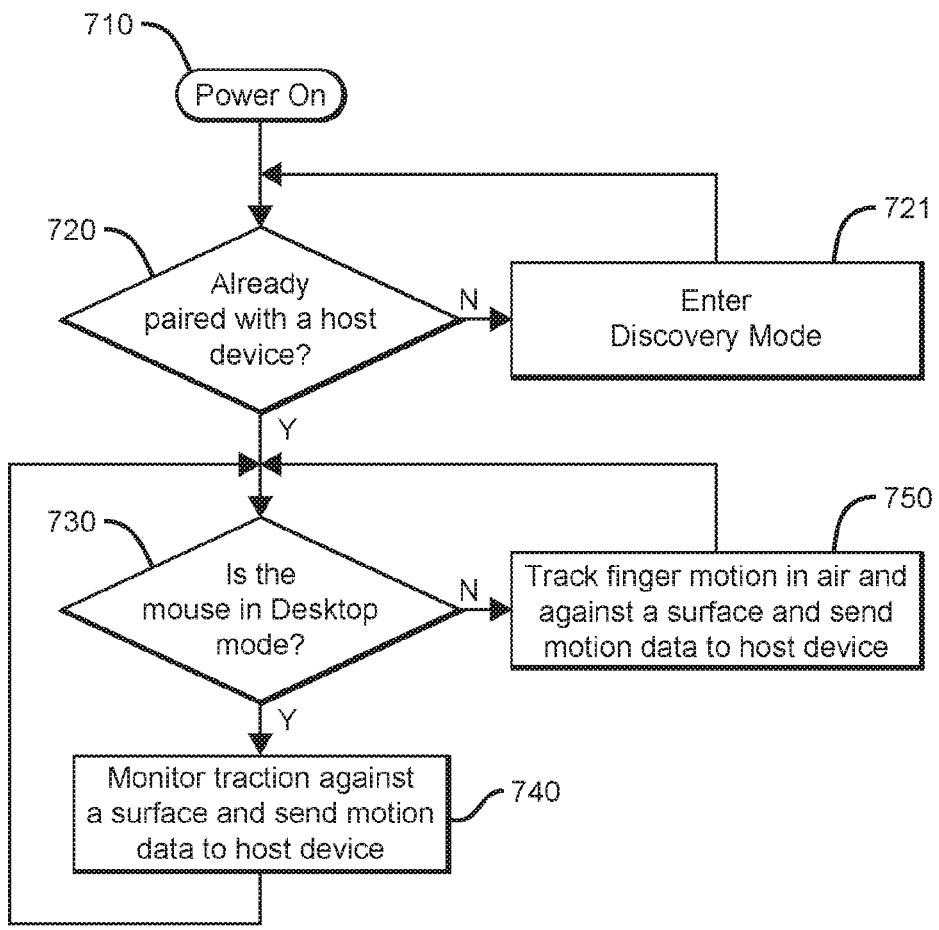
FIG. 7 is a flow chart of aspects of the operation of the finger-wearable unit, according to embodiments of the inventive subject matter.

FIG. 7 provides an overview of aspects of the operation of the finger-wearable unit 200 in a flow chart form, according to embodiments of the inventive subject matter.

As shown in FIG. 7, the unit 200 is powered on at step 710. In embodiments, the finger-wearable unit 200 can be powered on when undocked by actuating the micro-switch 213 of sensor module 210 (e.g., holding the micro-switch on for a certain amount of time). In other embodiments, the finger-wearable unit 200 can include a dedicated power button or switch. It is also contemplated that, in embodiments, mouse frame 100 has a power switch or power button, as is known in the art for wireless control interfaces. If the unit 200 is docked within mouse frame 100, it is powered on by the activation of the power button in mouse frame 100.

If the mouse frame 100 is connected to the host machine via a wired connection and the unit 200 is docked within the frame 100, the power-on sequence of step 710 can be in response to a signal from the host machine during the boot up of the host machine or in response to the connection of the mouse frame 100 to the host machine.

At step 720, the microcontroller 231 checks to determine whether it is already paired with a host device and/or connected to the host device to which it is paired. If not, the microcontroller 231 enters discovery mode where it can discover host devices with which to pair at step 721.

If the unit 200 is paired, then the microcontroller 231 checks to see whether the unit 200 is in "desktop mode" (i.e., docked within mouse frame 100) via plug-and-play detection of the frame 100 or other methods of connection detection known in the art. In embodiments, this check can alternatively be performed at the power-on stage by determining whether the unit 200 was powered on via the activation of a button on frame 100 or via a signal from the host computer as discussed above or via an interaction with the unit 200 itself.

If the unit 200 is in desktop mode, the microcontroller 231 then operates accordingly at step 740. While in desktop mode, the microcontroller 231 only detects the motion against a surface such as a table top (via optical sensor 211, or if the mouse frame 100 has its own navigation sensor, via the mouse frame's navigation sensor) and accepts the button and other inputs (e.g., scroll wheel, etc.) from the mouse frame 100, and sends these commands to the host machine. The microcontroller can also disable the accelerometer 212 and inputs of the unit 200 itself (e.g., micro-switch 213 and other inputs) or simply disregard any inputs or signals from the sensors of the unit 200 itself. The mouse frame 100 may also, in embodiments, have features that the unit 200 itself does not have (e.g., haptic feedback, etc.). The microcontroller 231 is also programmed to operate these additional features while docked.

If the unit is not in desktop mode, then the microcontroller 231 is programmed to operate according to "free" mode at step 750, whereby it can track finger motion in the air (based on signals from accelerometer 212; within free mode, this first mode could be considered "3D mode") and also along a surface (based on optical navigation sensor 211; within free mode, this second mode could be considered "surface mode"), and also accept inputs by detecting contact with the micro-switch 213 and other touch sensors and/or micro-switches present in the unit, and sends these signals to the host computer. In order to maintain consistent input as a user may transition from three-dimensional use (in 3D space) to two-dimensional (on a surface) use and vice-versa, the microcontroller 231 can be programmed to prioritize either the inputs of the navigation sensor 211 or the accelerometer 212 when the navigation sensor 211 detects movement relative to a surface. For example, the microcontroller 231 is, in embodiments, programmed to use the sensor readings from the navigation sensor 211 for the movements along the two-dimensional plane whenever the navigation sensor 211 senses a surface and disregard signals along the two-dimensional plane from accelerometer 212 (i.e., along a first and second axis of movement). However, for movements in the third dimension/third axis (i.e., away from the two-dimensional surface), the microcontroller 231 still uses the information from the accelerometer 212. If no surface is detected by the navigation sensor 211 for a particular amount of time (e.g., half a second, 1 second, etc), then the signals from accelerometer 212 are used to detect movement in all directions and any occasional signal from the navigation sensor 211 is dismissed as noise. Thus, the microcontroller 231 can account for small separations from a surface such as when the edge of a surface is reached or the user has reached the end of how far they can reach and must lift the unit 200 off the surface and bring their arm in closer to continue to scroll in the same direction. In embodiments, the microcontroller 231 can be programmed to change from surface mode (i.e., using the navigation sensor 211 to detect movement along a surface) to 3D mode (relying only on the accelerometer 212 to detect movement along all three axis) based on a sufficiently large signal from accelerometer 212 along the third axis (e.g., reflecting that the user has removed the unit 200 from the surface and doesn't intend to continue using the unit 200 along the surface any longer).

As such, the microcontroller 231 can switch how it processes signals from the accelerometer 212 upon detection of a surface by the navigation sensor 211 (switching to the navigation sensor 211 for the "2D" signals upon surface detection) and then when the surface is no longer detected (switching to the accelerometer 212 for all three sensed directions).

FIGS. 8A-8B illustrate another embodiment of the docking mechanism of the finger-wearable unit 200 with a mouse frame 800.

As seen in FIG. 8A, the cavity of mouse frame 800 has a docking station for unit 200, whereby inward flaps 821, 822, 823, 824 form an inverted pyramid at the center of which is docking position 810 (hidden in FIG. 8A by the docked unit 200). The docking position 810 is dimensioned to correspond to the shape of the underside of module 210, and can include a magnetic element to attract the module 210 of unit 200 and hold it in place once it is engaged. In embodiments, docking position 810 can also include a depression (similar to the docking slot 110 of FIG. 1A) dimensioned such that the module 210 of unit 200 fits into the depression to prevent lateral movement. The exposed end of connector 150 of FIG. 3 can comprise the front side of the depression such that when module 210 is introduced into the depression, the module 210 connects to connector 150.

As seen in FIG. 8B, the inward side flaps 821-824 are made of an elastic material and are biased such that they are stretched when the docking position 810 with the docked unit 200 is pushed downward to a lowered position, and to raise the docking position 810 and docked unit 200 to the raised position of FIG. 8A when released for removal. To keep the docked unit 200 at a lowered position, the mouse frame 800 includes a latch 830 configured to engage with a corresponding latch mechanism (such as a loop or other latching mechanism) on the underside of docking position 810 or flap 823. The latch 830 is mechanically coupled with release mechanism (button) 840 such that, when the release button 840 is pressed, the latch 830 releases the engaged docking position 810 or flap 823 to bring the finger-wearable unit 200 to the top enabling a user to conveniently put a finger and detach the unit. After use, a user can place the finger-wearable unit 200 back into docking position 810 and press down to reinsert finger-wearable module 200 to the mouse base 100. The latch 830 locks into place the finger-wearable unit 200 to make it into a desktop version of the mouse.

FIG. 8C provides an embodiment of the mouse frame 800 of FIGS. 8A-8B whereby a spring element 850 (here, a coil spring is shown, but other springs or equivalent elements that provide a biasing force are contemplated) coupled to the docking position 810 and/or one of the flaps 821-824 is used in addition to or instead of elastic flaps 821-824. In these embodiments, the latch 830 can engage the spring element when lowered to lock the assembly in place.

In embodiments, the opening formed by the inverted pyramid is uncovered. Thus, the measurements of the inverted pyramid structure on the mouse frame 800 are such that the palm of a user will be able to rest comfortably to operate the desktop version of the mouse 800. In other embodiments, a hinged or removable door or cover that conforms to the shape of the top of the mouse can be used to cover the opening such that the opening is not felt by the user during the use of the mouse frame 800 with the docked unit 200.

In the embodiments of FIGS. 8A-8C, the docking position 810 is considered to have a bottom surface that the unit 200 can rest upon. However, it is contemplated that, in certain embodiments, the docking position 810 is formed by the edges of the flaps 821-824 but has no underside surface. In these embodiments, the docking position 810 is dimensioned to be smaller than the dimensions of the module 210 of unit 200 such that the unit 200 is held in place by the flaps 821-824, with the underside of the module 210 exposed underneath. In these embodiments, the features of FIGS. 8A-8C (e.g., latch 830, spring element 850, etc.) that engage with the bottom surface of docking position 810 instead engage with one or more of the flaps 821-824 and/or the underside of module 210 itself. In these embodiments, the underside of the module 210 can be exposed through the bottom of mouse frame 800 such that the optical movement sensor 211 is used to detect the surface under mouse frame 800 to process the movement of mouse frame 800 for translation into control of the mouse cursor or other corresponding function in the host machine.

FIGS. 9 and 10 illustrate further alternatives embodiment of the mouse frame. FIG. 9 shows a mouse frame 900 with a cutaway view of cavity 901. In FIG. 9, the cavity 901 is dimensioned to approximately correspond to the cross-sectional shape of the finger-wearable unit 200, such that the finger-wearable unit can be inserted into the cavity 901 by the introduction of the unit 200 while on the user's finger. As seen in FIG. 9, the cavity 901 extends inward into mouse frame 900 at an off-horizontal angle. Examples of suitable angles can include 20 degrees, 30 degrees, 45 degrees, 60 degrees or other off-horizontal angles. Thus, the top surface 902 and the bottom surface 903 of the cavity 901 are flat so as to match the flat surfaces of the sensor module 210 on the underside of the unit 200 and the module 220 or 230 that is on the top of the module stack at the upper part of the unit 200. The side surfaces of the cavity 901 are curved so as to accommodate the curvature of the links 240A, 240B.

To secure the finger-wearable unit 200 while docked, mouse frame 900 includes a lock mechanism 910 having one or more arms 911 that have tabs or hooks 912 at the end. The arms 911 of lock mechanism 910 are configured to be actuated between a locked and an unlocked position. The tabs 912 are configured to engage the rear sides of the modules 210 and 220/230 when the lock mechanism 910 is in the lock position, thereby preventing removal of the unit 200 from frame 900 (and dislodging from the connection with connector 150).

In one example, the lock mechanism 910 is actuated via a contact of a curved surface 914 of the arms 911 against a corresponding surface 915 of the mouse frame 900, whereby a motion of the lock mechanism 910 inward (for example, actuated by the push of a button), which causes the arms 911 to be pushed away from cavity 901 due to the contact of the surfaces 914 and 915, thus retracting the tabs 912. In embodiments, the surfaces 915 can be curved or tapered to assist with the motion of the arms 911 due to contact with surfaces 914.

Other mechanical or electro-mechanical means to actuate the tabs 912 are similarly contemplated.

In an unlock position, the tabs 912 are sufficiently retracted (via a movement of the arms 911 away from the cavity 901) such that they do not significantly impede the outward movement of the modules of the unit 200, thus allowing undocking of unit 200 from the frame 900.

In order to release the unit 200, the lock mechanism 910 includes a button 913 that actuates the arms 911 (and thus tabs 912). The button 913 is disposed at the end of cavity 901, extending from the end surface of cavity 901 such that a user's finger is able to fully actuate it even when the unit 200 is at its final docking position within cavity 901, with module 210 abutting against the connector 150. Because a user's fingertip will typically extend beyond the end of the module 210 at the docking position, the cavity 901 (and the button 913) preferably extends further inward than the connector 150, such that the unit 200 does not sit at the very end against an end surface of the cavity 901. This way, when the user introduces their finger into the cavity 901 to undock unit 200, the user is able to introduce their finger sufficiently so that sufficient contact between their finger and the inner surfaces of unit 200 is made such that, when the lock mechanism 910 is toggled to the unlock position, the friction of the finger with unit 200 removes the unit 200 when the finger is withdrawn from the cavity 901. It is contemplated that the inner surfaces of cavity 901 can also have additional stops (e.g., tabs or other physical stops) that are aligned relative to the connector 150 such that they also contact the unit 200 and help prevent further travel into cavity 901. The button 913 can be configured to actuate the toggle before reaching the absolute end of its travel distance. Thus, even users whose finger dimensions do not allow them to fully reach the end of cavity 901 before fully engaging the inner surfaces of unit 200 can remove and secure the unit 200 within frame 900. In other embodiments, the button 913 is disposed such that it is flush with the end of the module 210.

In embodiments, the lock mechanism 910 is configured such that each button press changes the state of the lock mechanism 910 from a state of locked or unlocked to the other one of the states (such as via a spring-based retractable actuation mechanism).

In these embodiments, the process of undocking and docking the unit 200 works as follows: A user is using the combined frame 900 with docked unit 200 (the clasp mechanism and wishes to remove the unit 200 for use by itself. The user introduces their finger into cavity 901, and in doing so through the inside of the unit 200. The user's finger eventually actuates button 913, causing the tabs 912 to retract. When the user retracts their finger from cavity 901, the friction of their finger and the inner surfaces of the unit 200 causes the unit 200 to be withdrawn from the cavity 901 already in a worn position ready for use. The lock mechanism 910 remains in the "unlocked" position.

To dock the unit 200, the user introduces their finger with the unit 200 into cavity 901. The unit 200 (on the user's finger) travels into the cavity 901 until it abuts against connector 150. The user's finger extends to actuate button 913, causing tabs 912 to move to a locked position, engaging the rear of the modules of unit 200. When the user removes their finger from cavity 901, the tabs 912 prevent the movement of unit 200. Thus, the unit 200 is removed from the user's finger and remains docked within mouse frame 900.

FIG. 10 shows an embodiment whereby instead of lock mechanism 900, mouse frame 1000 includes one or more magnets 1010 that engage and secure the finger-wearable unit 200 when it is docked within frame 1000. In the embodiment of FIG. 10, the cavity 1001 and surfaces of cavity 1001 are the same of FIG. 9 except for the removal of the mechanisms and spaces used in FIG. 9 to secure and release the unit 200. In the embodiment of FIG. 10, the magnets 1010 engage with corresponding metallic or elements of the unit 200 to secure the unit 200 in place. To dock a removed unit 200, the user simply introduces the unit 200 while worn on their finger, without exerting any force against any of the sides of cavity 1001. The magnets 1010 then hold the unit 200 in place against the connector 150 and the user is able to remove their finger. To undock the unit 200, the user introduces their finger and, to overcome the force of magnets 1010, presses against the module 210 or the modules 220, 230 such that the friction between their finger and module being pressed overcomes the force of the magnets, and the unit 200 is thereby removed from frame 1000 already on the user's finger, ready to be used.

In a variation of the embodiment of FIG. 10, one or more of the magnets 1010 can be electromagnets that can be actuated by the press of a button (similar to the button 913 of FIG. 9) during a docking process. Thus, the magnetic force holding the unit 200 within frame 1000 can be toggled on or off depending on whether the unit 200 is being docked or undocked. In a variation of this embodiment, the electromagnets can be toggled on for a brief time (e.g., 5 or 10 seconds) such that the user is able to withdraw their finger while the electromagnets are on. After this time, the electromagnets are switched off to conserve power and the unit 200 remains in place held by regular magnets 1010.

It is contemplated that, in the embodiments of FIGS. 9 and 10, the cross-sectional dimensions of cavities 910, 1010 can be tapered such that they are larger at the surface of the mouse frames 900, 1000 and then decrease as the cavity 910 approaches the docking position for unit 200, with a constant dimension at the docking position so as to properly support the unit 200 while docked.

In the embodiments of FIGS. 9 and 10, the angle of insertion and placement of the unit 200 within the respective frames prevents the use of the two-dimensional navigation sensor 211 of unit 200 to handle the sensing along a surface while docked. As such, in the embodiments of FIGS. 9 and 10, the frames 900, 1000 are considered to have their own on-board navigation sensors that communicate their signals to the unit 200 for processing via the connector 150. However, it is contemplated that in variations to FIGS. 9 and 10, the cavities within the mouse frames is disposed parallel to the bottom of the frames such that the docking position for the unit 200 is parallel to the ground below and at a distance that allows the sensor 211 of unit 200 to handle the surface navigation functions while docked. In these embodiments, the docking position where unit 200 rests when docked has an opening through the bottom of the frames 900, 1000, such that the sensor 211 is exposed to the surface below the frame, as discussed above with regard to embodiments of FIGS. 1A-1C.

Although the concept disclosed in this article primarily concerns with computer mouse, it is contemplated that various aspects of the inventive subject matter could similarly be applied to other input control devices.

It should be apparent to those skilled in the art that many more modifications besides those already described are possible without departing from the inventive concepts herein. The inventive subject matter, therefore, is not to be restricted except in the spirit of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Where the specification claims refers to at least one of something selected from the group consisting of A, B, C . . . and N, the text should be interpreted as requiring only one element from the group, not A plus N, or B plus N, etc.

What is claimed is:

1. A computer input system, comprising:
    a mouse frame, comprising:
        a cavity extending into the mouse frame from an upper or upper-rear surface of the mouse frame;
        a docking slot disposed within the cavity, the docking slot dimensioned to receive a corresponding portion of a finger-wearable input unit;
        a plurality of elastic flaps extending inward from edges of the cavity at the upper surface of the mouse frame towards the docking slot;
        wherein the docking slot is centrally disposed between the plurality of elastic flaps;
        wherein the plurality of elastic flaps are biased to contract such that the docking slot is at a raised position when the elastic flaps are unstretched and configured to stretch to lower the docking slot to a lowered position into the cavity when a downward force is applied;
        a frame data connector disposed within the docking slot, the frame data connector aligned to connect with a corresponding unit data connector of the finger-wearable input unit when the finger-wearable input unit is docked within the docking slot;
        at least one frame input component, the at least one frame input component communicatively coupled to the frame data connector;
        a releasable latch mechanism configured to engage at least one of the docking slot and one of the plurality of elastic flaps when the docking slot is at the lowered position; and
        a release mechanism configured to disengage the latch mechanism from the at least one of the docking slot and plurality of elastic flaps when actuated.

2. The system of claim 1, wherein the mouse frame further comprises a frame two-dimensional navigation component communicatively coupled to the frame data connector, wherein the frame two-dimensional navigation component is configured to transmit signals to the finger-wearable input unit via the frame data connector when the finger-wearable unit is docked within the mouse frame.

3. The system of claim 1, further comprising:
    wherein the docking slot is dimensioned to receive a sensor module of the finger-wearable input unit, the docking slot further comprising an opening extending through the underside of the mouse frame and is disposed within the cavity such that the sensor module of the finger-wearable input unit is capable of sensing a surface upon which the mouse frame is placed when the finger-wearable input unit is docked within the mouse frame.

4. The system of claim 1, wherein the cavity is partly defined by a bottom surface extending inward from a surface of the mouse frame, and wherein the docking slot further comprises a channel along the bottom surface, extending inward from the surface of the mouse frame towards a docking position.

5. The system of claim 1, wherein the cavity is defined by a plurality of sloping surfaces sloped inward into the cavity toward the docking slot.

6. The system of claim 1, the mouse frame further comprising a cover door pivotably coupled to the mouse frame, the cover door dimensioned to cover the cavity and continue the shape of the mouse frame when closed and allow access to the cavity when opened.

7. The system of claim 1, further comprising an external cover, the external cover comprising:
an open end dimensioned to receive the cross-sectional area of the finger-wearable input unit and the user's finger;
a cavity extending into the external cover from the open end;
an external cover connector disposed within the cavity, the external cover connector aligned to connect with the unit data connector when the finger-wearable input unit is inserted into the external cover;
an opening along a bottom side surface of the external cover, such that the opening is aligned with the two-dimensional navigation sensor of the finger-wearable input unit when the finger-wearable input unit is inserted into the external cover; and
an external cover control input interface disposed on the outer surface of the external cover, communicatively coupled with the external cover connector.

8. The system of claim 7, wherein the external cover control input interface comprises a control input interface different from the at least one input detection component.

9. A computer input system, comprising:
a finger-wearable input unit, comprising:
a sensor module comprising:
a two-dimensional navigation sensor configured to detect movement relative to a surface along a first and second axis of movement;
a three-dimensional navigation sensor configured to detect movement along the first and second axis of movement and along a third axis of movement; and
at least one unit input detection component;
a microcontroller programmed to:
process signals from the two-dimensional navigation sensor according to a first mode of operation; and
process signals from the three-dimensional navigation sensor according to a second mode of operation;
a wireless communication interface; and
a unit data connector;
wherein the finger-wearable input unit is configured to wrap at least partially around a user's finger such that the sensor module rests under the user's finger while worn; and
a mouse frame, comprising:
a cavity extending into the mouse frame from an upper or upper-rear surface of the mouse frame;
a docking slot disposed within the cavity, the docking slot dimensioned to receive a corresponding portion of the finger-wearable input unit;
a frame data connector disposed within the docking slot, the frame data connector aligned to connect with the unit data connector when the finger-wearable input unit is docked within the docking slot;
at least one frame input component, the at least one frame input component communicatively coupled to the frame data connector;
a mini-PCB affixed within the mouse frame and communicatively coupled with the at least one frame input component;
a support platform disposed within the cavity, the support platform including the frame data connector and docking slot;
a spring assembly coupled to the mouse frame and the support platform such that the support platform is pivotally coupled with the mouse frame, capable of pivoting between a lowered position and a raised position; and
a latch mechanism configured to engage with the support platform when the support platform is at a lowered position, wherein the spring assembly causes the support platform to pivot upward when disengaged from the latch mechanism.

10. A computer input system, comprising:
a finger-wearable input unit, comprising:
a sensor module comprising:
a two-dimensional navigation sensor configured to detect movement relative to a surface along a first and second axis of movement;
a three-dimensional navigation sensor configured to detect movement along the first and second axis of movement and along a third axis of movement; and
at least one unit input detection component;
a microcontroller programmed to:
process signals from the two-dimensional navigation sensor according to a first mode of operation; and
process signals from the three-dimensional navigation sensor according to a second mode of operation;
a wireless communication interface; and
a unit data connector;
wherein the finger-wearable input unit is configured to wrap at least partially around a user's finger such that the sensor module rests under the user's finger while worn; and
a mouse frame, comprising:
a cavity extending into the mouse frame from an upper-rear surface of the mouse frame at an off-horizontal angle, the cavity dimensioned to receive the cross-sectional shape of the finger-wearable input unit;
a docking slot disposed within the cavity, the docking slot dimensioned to receive a corresponding portion of the finger-wearable input unit;
a frame data connector disposed within the docking slot and separated from an end of the cavity such that the frame data connector aligned to connect with the unit data connector when the finger-wearable input unit is inserted into the cavity and docked within the docking slot;
at least one frame input component, the at least one frame input component communicatively coupled to the frame data connector; and
a lock mechanism comprising:
at least one tab configured to be actuated between a locked position and an unlocked position, wherein the at least one tab extends into the cavity in the locked position to engage the finger-wearable input unit when the finger-wearable input unit is docked in the mouse frame, preventing movement of the finger-wearable input unit outwardly from the cavity, and retract from the cavity in the unlocked position to disengage from the finger-wearable input unit; and a release button extending from the end surface of the cavity, the release button mechanically coupled with the at least one tab, the release button configured to actuate the at least one tab between the locked position and the unlocked position.

\* \* \* \* \*